United States Patent
Aoshima

(10) Patent No.: US 9,467,306 B2
(45) Date of Patent: Oct. 11, 2016

(54) SWITCHING DEVICE AND RELAY SYSTEM

(71) Applicant: Hitachi Metals, Ltd., Minato-ku, Tokyo (JP)

(72) Inventor: Kenji Aoshima, Tsuchiura (JP)

(73) Assignee: Hitachi Metals, Ltd., Tokyo (JP)

(\*) Notice: Subject to any disclaimer, the term of this patent is extended or adjusted under 35 U.S.C. 154(b) by 139 days.

(21) Appl. No.: 14/341,332

(22) Filed: Jul. 25, 2014

(65) Prior Publication Data

US 2015/0215135 A1    Jul. 30, 2015

(30) Foreign Application Priority Data

Jan. 30, 2014 (JP) .................................. 2014-15597

(51) Int. Cl.
*H04L 12/46* (2006.01)

(52) U.S. Cl.
CPC ....... *H04L 12/4641* (2013.01); *H04L 12/4633* (2013.01)

(58) Field of Classification Search
CPC ........... H04L 12/4633; H04L 12/4641; H04L 12/2859; H04L 12/287; H04L 45/66; H04L 45/50; H04L 12/437; H04L 45/28; H04L 45/00; H04L 12/2856; H04L 12/4645; H04L 45/60
See application file for complete search history.

(56) References Cited

U.S. PATENT DOCUMENTS

| | | | | |
|---|---|---|---|---|
| 2007/0098006 A1* | 5/2007 | Parry | ................. | H04L 12/4633 370/437 |
| 2008/0028077 A1* | 1/2008 | Kamata | ............... | H04L 12/4641 709/227 |
| 2008/0172497 A1* | 7/2008 | Mohan | ................ | H04L 12/4616 709/249 |
| 2010/0208593 A1* | 8/2010 | Soon | ................... | H04L 12/2859 370/242 |
| 2010/0254258 A1* | 10/2010 | Zheng | .................. | H04L 12/437 370/222 |
| 2011/0019678 A1* | 1/2011 | Mehta | ................. | H04L 12/4625 370/401 |
| 2012/0008491 A1* | 1/2012 | Shimada | ............. | H04L 12/4633 370/218 |

FOREIGN PATENT DOCUMENTS

JP    2010-278814 A    12/2010

\* cited by examiner

*Primary Examiner* — Yee Lam
(74) *Attorney, Agent, or Firm* — Crowell & Moring LLP

(57) ABSTRACT

A core switching device has a virtual path table and an address table, and selectively performs a PBB operation and a virtual path operation. The virtual path table retains a correspondence relation between a service instance identifier and two ports in a plurality of ports set in advance. The address table retains a correspondence relation between the plurality of ports and an encapsulation address. The core switching device relays an encapsulated frame based on the address table in the PBB operation and relays an encapsulated frame containing the service instance identifier retained in the virtual path table between the two ports retained in the virtual path table in the virtual path operation.

17 Claims, 13 Drawing Sheets

FIG. 3

FDB1: ADDRESS TABLE OF SWE1

| CMAC | ISID | BMAC | PORT ID |
|---|---|---|---|
| ... | ... | ... | ... |
| CA41 | BBB | BA2 | {Pu} |
| CA31 | BBB | (BA1) | {Pd[n]} |
| ... | ... | ... | ... |

FIG. 4

FDB2: ADDRESS TABLE OF SWC

| BMAC | BVID | PORT ID |
|---|---|---|
| ... | ... | ... |
| BA1 | BB | {P[1]} |
| BA2 | BB | {P[2]} |
| ... | ... | ... |

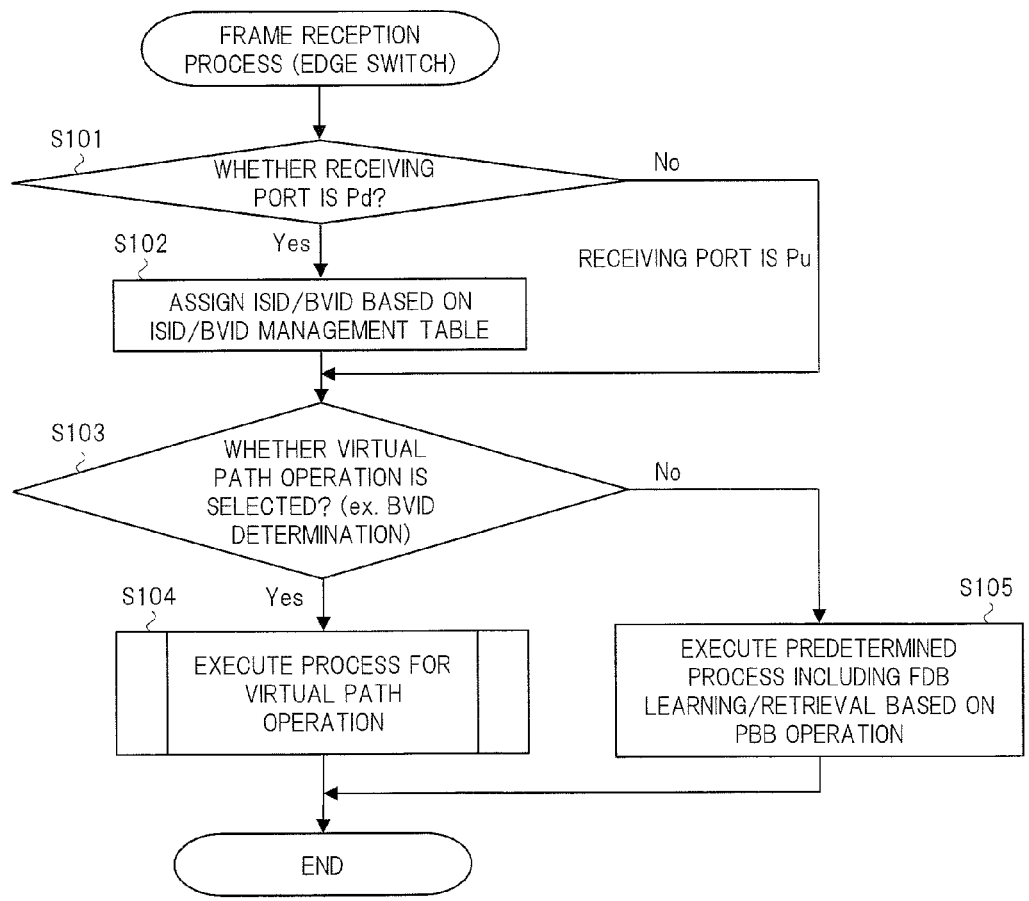

FIG. 15A

61: INTERNAL IDENTIFIER MANAGEMENT TABLE

| RECEPTION PORT ID | SVID | ISID | IVID | VIRTUAL PATH OPERATION IDENTIFIER |
|---|---|---|---|---|
| ... | ... | ... | ... | ... |
| {Pd[1]} | A | | aaa | MM |
| ... | ... | ... | ... | ... |
| {Pu} | | AAA | aaa | |
| ... | ... | ... | ... | ... |

RETRIEVAL KEY (RECEPTION PORT ID, SVID, ISID)

FIG. 15B

63: EXTERNAL IDENTIFIER MANAGEMENT TABLE

| RECEPTION PORT ID | IVID | ISID | BVID | SVID |
|---|---|---|---|---|
| ... | ... | ... | ... | ... |
| {Pd[1]} | aaa | | | A |
| ... | ... | ... | ... | ... |
| {Pu} | aaa | AAA | MM | |
| ... | ... | ... | ... | ... |

RETRIEVAL KEY (RECEPTION PORT ID, IVID)

SWITCHING DEVICE AND RELAY SYSTEM

CROSS-REFERENCE TO RELATED APPLICATION

The present application claims priority from Japanese Patent Application No. 2014-015597 filed on Jan. 30, 2014, the content of which is hereby incorporated by reference into this application.

TECHNICAL FIELD OF THE INVENTION

The present invention relates to a switching device and a relay system, for example, a switching device and a relay system to which the MAC-in-MAC is applied.

BACKGROUND OF THE INVENTION

For example, Japanese Patent Application Laid-Open Publication No. 2010-278814 (Patent Document 1) discloses a method of determining a broadcast domain by a service instance identifier (ISID) in a PBB network. Specifically, in each switching device in a PBB network, a correspondence relation between a service instance identifier (ISID) and a port corresponding thereto is retained in a table, by which a broadcast domain for each service instance identifier (ISID) is determined.

SUMMARY OF THE INVENTION

As a technique for realizing a wide-area Ethernet, for example, the extended VLAN and the MAC-in-MAC have been known. The extended VLAN is standardized by IEEE 802.1ad, and is a technique for extending the number of VLANs (Virtual Local Area Network) by adding a service-provider VLAN tag to a customer VLAN tag based on IEEE 802.1Q. The MAC-in-MAC is a technique of encapsulating a customer MAC (Media Access Control) frame by a service-provider MAC frame, thereby achieving the further extension of the number of VLANs based on the extended VLAN and the reduction of the number of MAC addresses learned in a switch (so-called core switch) in a wide-area network. As a detailed method of the MAC-in-MAC, PBB (Provider Backbone Bridge) based on IEEE 802.1ah has been known.

In the PBB, usually, a backbone VLAN identifier (BVID) set by a service provider is used as a VLAN for relaying in the PBB network. The backbone VLAN identifier (BVID) is generally set in the form of bundling a plurality of service instance identifiers (ISID), and a broadcast domain of the PBB network is determined by this backbone VLAN identifier (BVID). Therefore, there is a possibility that the traffic amount in the PBB network is increased when the flooding occurs.

In such a circumstance, as described in the Patent Document 1, a method in which a broadcast domain in the PBB network is determined based on a service instance identifier (ISID) is conceivable. For example, this method is effective when there are a relatively large number of edge switches which manage the same service instance identifier (ISID). However, for example, this method is wasteful when there are only two edge switches which manage the same service instance identifier (ISID).

Specifically, there is a case in which it is desired to perform the point-to-point communication between two edge switches at high speed while utilizing the existing PBB network. In the method described in the Patent Document 1, since the frame needs to be relayed based on the FDB (Forwarding DataBase) even in the point-to-point communication like this, there is a possibility that the entries of FDB are wastefully consumed by the learning of MAC addresses.

Furthermore, since a table for determining a broadcast domain is necessary, the storage capacity may be increased.

The present invention has been made in view of the problem mentioned above, and one object of the present invention is to provide a switching device and a relay system capable of achieving the efficient point-to-point communication by using the PBB.

The above and other objects and novel characteristics of the present invention will be apparent from the description of the present specification and the accompanying drawings.

The following is a brief description of an outline of the typical embodiment of the invention disclosed in the present application.

A switching device of the present embodiment is a switching device which is placed in a PBB network in which relay based on a PBB standard is performed and relays an encapsulated frame. The encapsulated frame contains a service instance identifier, a backbone VLAN identifier and an encapsulation address, which is a MAC address of an edge switching device placed at an entrance or an exit of the PBB network, based on the PBB standard. The switching device includes: a plurality of ports; a virtual path table; an address table; a PBB operation; and a virtual path operation. The virtual path table retains a correspondence relation between a first identifier (service instance identifier or internal VLAN identifier assigned in the device in association therewith) and two ports in the plurality of ports set in advance. The address table retains a correspondence relation between the plurality of ports and the encapsulation address. In the PBB operation, the encapsulated frame is relayed based on the address table. In the virtual path operation, the encapsulated frame containing the first identifier retained in the virtual path table is relayed between the two ports retained in the virtual path table.

The effects obtained by typical embodiments of the invention disclosed in the present application will be briefly described below. That is, it is possible to achieve the efficient point-to-point communication in a switching device and a relay system using the PBB.

BRIEF DESCRIPTIONS OF THE DRAWINGS

FIG. 3 is a diagram showing a configuration example of an address table provided in an edge switching device in the relay system of FIG. 1;

FIG. 4 is a diagram showing a configuration example of an address table provided in a core switching device in the relay system of FIG. 1;

FIG. 7 is a diagram showing a configuration example of an ISID/BVID management table in FIG. 6;

FIG. 8 is a flowchart showing an example of a process at the time of receiving a frame in the edge switching device of FIG. 6;

FIG. 15A is a diagram showing a configuration example of an internal identifier management table in FIG. 14; and FIG. 15B is a diagram showing a configuration example of an external identifier management table in FIG. 14.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted.

(First Embodiment)

<<Outline of Relay System (Premise)>>

Figure 1:
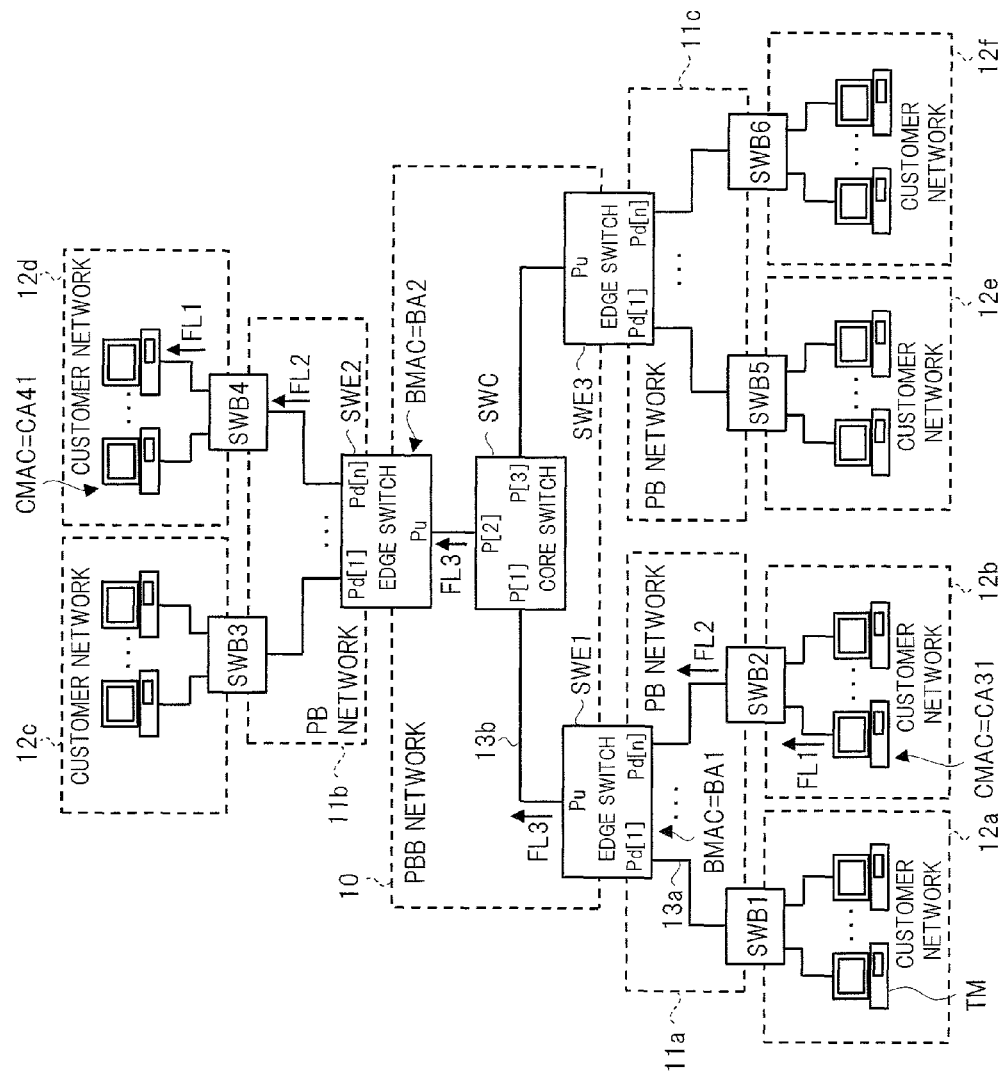
FIG. 1 is a schematic diagram showing a configuration example and an operation example to be a premise in a relay system according to the first embodiment of the present invention.

FIG. 1 is a schematic diagram showing a configuration example and an operation example to be a premise in a relay system according to the first embodiment of the present invention. The relay system shown in FIG. 1 includes a plurality of (here, six) customer networks 12a to 12f, a plurality of (here, three) PB networks 11a to 11c which undertake the relay between the customer networks 12a to 12f and a PBB network 10 which undertakes the relay between the PB networks 11a to 11c. In this case, the PB network 11a undertakes the relay between the customer networks 12a and 12b, the PB network 11b undertakes the relay between the customer networks 12c and 12d, and the PB network 11c undertakes the relay between the customer networks 12e and 12f.

Hereinafter, the plurality of customer networks 12a to 12f are collectively referred to as a customer network 12, and the plurality of PB networks 11a to 11c are collectively referred to as a PB network 11. The PBB network 10 is a relay network through which the relay based on IEEE 802.1ah (so-called PBB standard) is performed. The PB network 11 is a relay network to which the above-mentioned extended VLAN is applied.

The customer network 12 is provided with a plurality of customer terminals TM. Switches SWB1 and SWB2 are placed at respective boundary parts between the customer networks 12a and 12b and the PB network 11a which connects these customer networks. Each of the switches SWB1 and SWB2 undertakes the relay between the plurality of customer terminals TM present in its own lower link and undertakes also the relay between each customer terminal TM and the PB network 11a present in its own upper link.

Similarly, switches SWB3 and SWB4 are placed at respective boundary parts between the customer networks 12c and 12d and the PB network 11b, and switches SWB5 and SWB6 are placed at respective boundary parts between the customer networks 12e and 12f and the PB network 11c. Each of the switches SWB3 to SWB6 undertakes the relay between the plurality of customer terminals TM present in its own lower link and undertakes also the relay between each customer terminal TM and the PB network 11 present in its own upper link. Hereinafter, the plurality of switches SWB1 to SWB6 are collectively referred to as a switch SWB.

Switching devices (specifically, edge switching devices) SWE1 to SWE3 are placed at respective boundary parts (in other words, entrance and exit of the PBB network 10) between the PB networks 11a to 11c and the PBB network 10 which connects these PB networks. The edge switching device SWE1 undertakes the relay between the plurality of switches SWB1 and SWB2 present in its own lower link and undertakes also the relay between each of the switches SWB1 and SWB2 and the PBB network 10. Similarly, each of the edge switching devices SWE2 and SWE3 undertakes the relay between the plurality of switches SWB present in its own lower link and undertakes also the relay between each switch SWB and the PBB network 10. Hereinafter, the plurality of edge switching devices SWE1 to SWE3 are collectively referred to as an edge switching device SWE.

The edge switching device SWE is provided with a plurality of ports (second ports) including n lower-link ports Pd[1] to Pd[n] and an upper-link port Pu. The lower-link ports Pd[1] and Pd[n] of the edge switching device SWE1 are connected to the switches SWB1 and SWB2 through communication lines 13a, respectively. Similarly, the lower-link ports Pd[1] and Pd[n] of the edge switching device SWE2 are connected to the switches SWB3 and SWB4, and the lower-link ports Pd[1] and Pd[n] of the edge switching device SWE3 are connected to the switches SWB5 and SWB6.

Here, the example in which two switches SWB are connected to the lower-link ports Pd[1] to Pd[n] of each edge switching device SWE is shown as a matter of convenience, but three or more switches SWB can be connected thereto in practice. More specifically, the edge switching device SWE can accommodate three or more customer networks 12.

Also, between the plurality of edge switching devices SWE in the PBB network 10, a switching device (specifically, core switching device) SWC which undertakes the relay between the plurality of edge switches SWE is placed. The core switching device SWC is provided with a plurality of ports (first ports) P[1] to P[3], and the edge switching devices SWE are connected ahead of the ports P[1] to P[3] through communication lines 13b. In the example of FIG. 1, the port P[1] is connected to the upper-link port Pu of the edge switching device SWE1 through the communication line 13b. Similarly, the ports P[2] and P[3] are connected to the upper-link ports Pu of the edge switching devices SWE2 and SWE3, respectively.

Here, the example in which one core switching device SWC is placed in the PBB network 10 is shown as a matter of convenience, but a plurality of core switching devices SWC may be sequentially placed between the plurality of edge switching devices SWE. Also, the example in which one upper-link port Pu is provided in each edge switching device SWE is shown here, but a plurality of upper-link ports Pu may be provided. In this case, the plurality of upper-link ports Pu may be connected to respectively different core switching devices SWC, or some of the plurality of upper-link ports Pu may be directly connected between the plurality of edge switching devices SWE without interposing the core switching device SWC. Furthermore, the example in which three edge switching devices SWE are placed is shown as a matter of convenience, but four or more edge switching devices SWE may be placed.

Here, an operation example of the relay system of FIG. 1 will be described based on the case of FIG. 1 in which a frame is transmitted from the customer terminal TM in the customer network 12b to the customer terminal TM in the customer network 12d. In this case, the MAC address (customer address) CMAC of the customer terminal TM in the customer network 12b serving as a source is "CA31" and the MAC address (customer address) CMAC of the customer terminal TM in the customer network 12d serving as a destination is "CA41". Also, the MAC address (encapsulation address) BMAC of the edge switching device SWE1 is "BA1" and the MAC address (encapsulation address) BMAC of the edge switching device SWE2 is "BA2".

Figure 2:
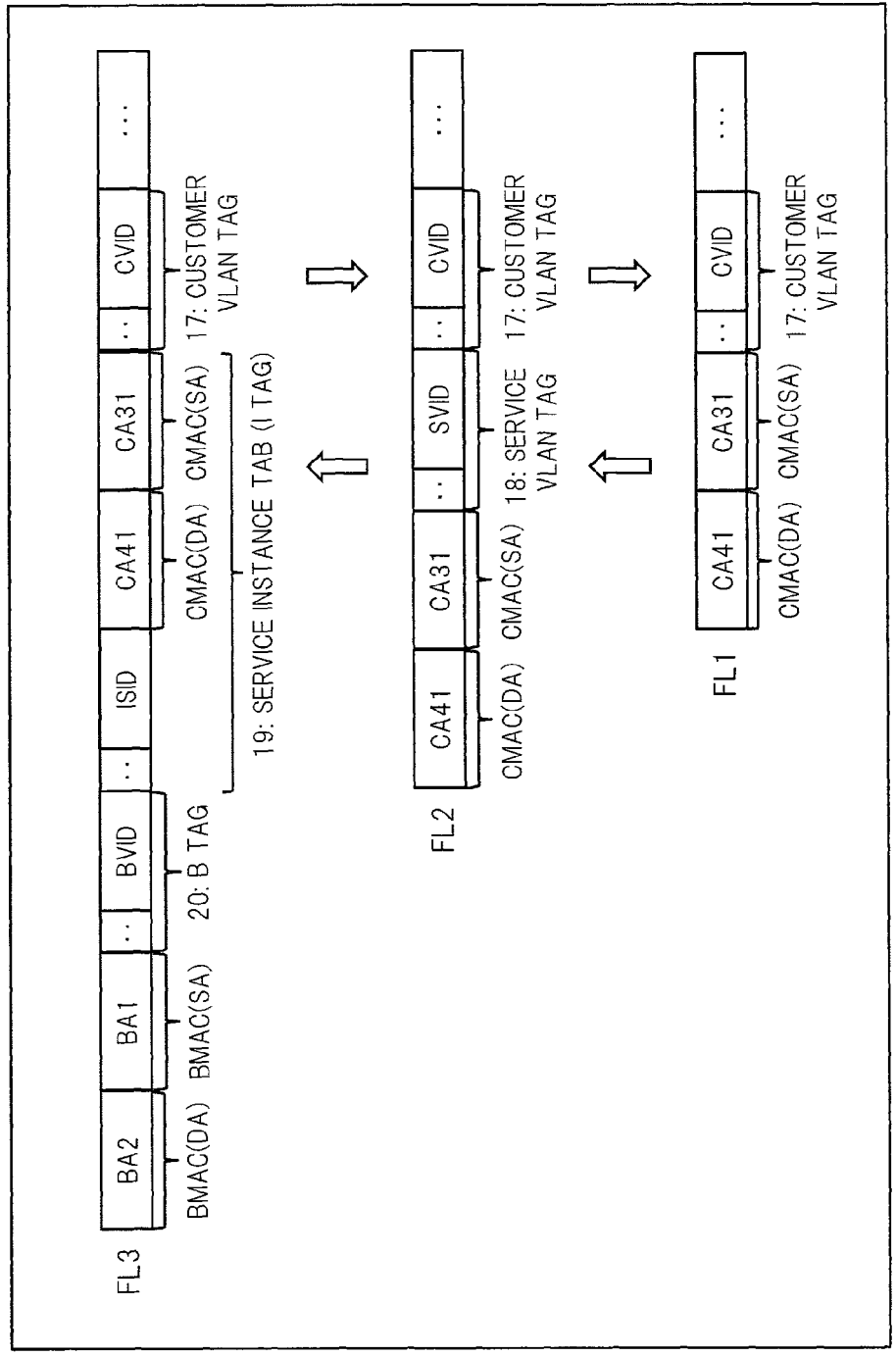
FIG. 2 is a diagram showing a format configuration example of a main part of a frame flowing through respective relay networks in the relay system of FIG. 1.

FIG. 2 is a diagram showing a format configuration example of a main part of a frame flowing through respective relay networks in the relay system of FIG. 1. FIG. 3 is a diagram showing a configuration example of an address table provided in the edge switching device SWE1 in the relay system of FIG. 1. FIG. 4 is a diagram showing a configuration example of an address table provided in the core switching device SWC in the relay system of FIG. 1.

As shown in FIG. 1 and FIG. 2, first, the customer terminal TM serving as a source transmits a frame FL1 into the customer network 12b. The frame FL1 in the customer network 12b is an unencapsulated frame containing a customer VLAN tag 17, a source customer address CMAC (SA) and a destination customer address CMAC (DA). The customer address CMAC is a MAC address present outside the PBB network 10. Here, the source customer address CMAC (SA) is the MAC address "CA31", and the destination customer address CMAC (DA) is the MAC address "CA41". The customer VLAN tag 17 contains a customer VLAN identifier CVID arbitrarily set by a customer.

Next, as shown in FIG. 1, the switch SWB2 receives the frame FL1 and transmits the frame FL2 into the PB network 11a. The frame FL2 is an extended VLAN frame and is an unencapsulated frame obtained by adding a service VLAN tag 18 to the frame FL1 as shown in FIG. 2. The service VLAN (extended VLAN) tag 18 contains a service VLAN identifier SVID arbitrarily set by a service provider or others. The switch SWB2 adds the service VLAN tag 18 to the frame FL1 based on the setting by the service provider or others.

Subsequently, the edge switching device SWE1 receives the frame FL2 and learns the information of the source on an address table FDB1 as shown in FIG. 3. Specifically, the edge switching device SWE1 learns a correspondence relation among the source customer address CMAC "CA31" contained in the frame FL2, a service instance identifier ISID (here, "BBB") assigned to the frame FL2 and a port identifier {Pd[n]} which has received the frame FL2. In this specification, {Pd[n]} indicates an identifier (ID) of the lower-link port Pd[n]. Hereinafter, for example, {AA} similarly indicates an identifier (ID) of AA.

Here, the address table FDB1 of FIG. 3 retains also a correspondence relation between the source customer address CMAC "CA31" and the encapsulation address BMAC "BA1" as a matter of convenience. However, since the encapsulation address BMAC "BA1" is a MAC address of the edge switching device SWE1 itself, it is not always necessary to retain it on the address table FDB1.

Also, the service instance identifier ISID "BBB" is an identifier having a 24-bit region for identifying a customer, and is arbitrarily set by a service provider or others in advance. As a typical setting method thereof, a method of associating the 12-bit service VLAN identifier SVID contained in the frame FL2 with the service instance identifier ISID can be cited. At this time, a method of associating one service VLAN identifier SVID with one service instance identifier ISID or a method of associating a plurality of service VLAN identifiers SVID with one service instance identifier ISID may be used. This 24-bit service instance identifier ISID makes it possible to further extend the 12-bit service VLAN identifier SVID.

When the edge switching device SWE1 receives the frame FL2, it retrieves the address table FDB1 based on the information of the destination of the frame FL2 in addition to the above-described learning of the address table FDB1. Here, as shown by the address table FDB1 of FIG. 3, it is presupposed that the edge switching device SWE1 has learned the correspondence relation among the customer address CMAC "CA41", the service instance identifier ISID "BBB", the encapsulation address BMAC "BA2" and the upper-link port identifier {Pu} through past communications.

The edge switching device SWE1 retrieves the address table FDB1 with using the destination customer address CMAC "CA41" and the service instance identifier ISID "BBB" of the frame FL2 as retrieval keys. As a result, it turns out that the destination port is the upper-link port Pu. Then, the edge switching device SWE1 transmits a frame FL3 into the PBB network 10 through the upper-link port Pu as shown in FIG. 1.

As shown in FIG. 2, the frame FL3 is an encapsulated frame obtained by adding the service instance identifier ISID, a backbone VLAN tag (B tag) 20, the source encapsulation address BMAC (SA) and the destination encapsulation address BMAC (DA) to the frame FL2 which is an unencapsulated frame. However, in the frame FL3 based on the PBB standard, the service VLAN tag 18 contained in the frame FL2 is optional, and the configuration which does not contain the service VLAN tag 18 for the reduction of a frame length is shown as the frame FL3 of FIG. 2.

The backbone VLAN tag (B tag) 20 contains the backbone VLAN identifier BVID. The edge switching device SWE1 stores its own MAC address "BA1" in the source encapsulation address BMAC (SA) and stores the MAC address "BA2" of the edge switching device SWE2 based on the address table FDB1 in the destination encapsulation address BMAC (DA).

Furthermore, the edge switching device SWE1 stores predetermined values set in advance in the service instance identifier ISID and the backbone VLAN identifier BVID of FIG. 2. For example, based on the example of FIG. 3, the service instance identifier ISID is "BBB". As shown in FIG. 2, the service instance identifier ISID is contained in the service instance tag (I tag) 19 together with the source customer address CMAC (SA) and the destination customer address CMAC (DA).

The backbone VLAN identifier BVID is an identifier which is arbitrarily set in advance by a service provider or others and is used for controlling the path at the time of relaying, and it has a 12-bit region. The broadcast domain in the PBB network 10 is determined by the backbone VLAN identifier BVID. As a typical setting method thereof, a method of associating a plurality of service instance identifiers ISID with one backbone VLAN identifier BVID can be cited. The edge switching device SWE1 stores the backbone VLAN identifier BVID (here, "BB") set in advance in association with the service instance identifier ISID in this manner in the frame FL3 of FIG. 2.

The core switching device SWC in FIG. 1 receives the frame FL3 and learns the information of the source on an address table FDB2 as shown in FIG. 4. Specifically, the core switching device SWC learns a correspondence relation among the source encapsulation address BMAC "BA1" contained in the frame FL3, the backbone VLAN identifier BVID (here, "BB") assigned to the frame FL3 and a port identifier {P[1]} which has received the frame FL3.

Furthermore, the core switching device SWC retrieves the address table FDB2 based on the information of the destination of the frame FL3 in addition to the above-described learning of the address table FDB2. Here, as shown by the address table FDB2 of FIG. 4, it is presupposed that the core switching device SWC has learned the correspondence relation among the encapsulation address BMAC "BA2", the backbone VLAN identifier BVID "BB" and the port identifier {P[2]} through past communications.

The core switching device SWC retrieves the address table FDB2 with using the destination encapsulation address BMAC "BA2" and the backbone VLAN identifier BVID "BB" of the frame FL3 as retrieval keys. As a result, it turns out that the destination port is the port P[2]. Then, the core switching device SWC relays the frame FL3 received at the port P[1] to the port P[2] as shown in FIG. 1.

The edge switching device SWE2 receives the frame FL3 and learns the information of the source (specifically, customer address CMAC "CA31", service instance identifier ISID "BBB", encapsulation address BMAC "BA1" and port identifier {Pu}) on its own address table as shown in FIG. 1. Furthermore, the edge switching device SWE2 retrieves its own address table based on the information of the destination of the frame FL3. Here, it is presupposed that the information of the destination has been learned on the address table through past communications.

As a result, the edge switching device SWE2 recognizes that the destination encapsulation address BMAC (DA) is its own encapsulation address BMAC "BA2" and the customer address CMAC "CA41" having the service instance identifier ISID "BBB" is present ahead of the lower-link port Pd[n]. Then, the edge switching device SWE2 decapsulates the frame FL3 to convert it into the frame FL2 by adding the service VLAN tag 18, and transmits the frame FL2 to the switch SWB4. The switch SWB4 receives the frame FL2 and converts it into the frame FL1 by eliminating the service VLAN tag 18 from the frame FL2, and transmits the frame FL1 to the customer terminal TM having the customer address CMAC "CA41".

Here, the edge switching device SWE receives or transmits the frame FL2 from or to the PB network 11, but depending on cases, it can receive or transmit the frame FL1 from or to the customer network 12. More specifically, the edge switching device SWE can generate the frame FL3 by encapsulating the frame FL1 of FIG. 2 and can generate the frame FL1 by decapsulating the frame FL3.

Also, the example in which communication is performed between the customer terminal TM in the customer network 12b and the customer terminal TM in the customer network 12d through the PBB network 10 has been described here, but the communication through other path can also be properly performed by using the address table. For example, when communication is performed from the customer terminal TM in the customer network 12b to the customer terminal TM in the customer network 12a through the PBB network 11a, the edge switching device SWE1 relays the unencapsulated frame received at the lower-link port Pd[n] to the lower-link port Pd[1] based on the address table FDB1.

Also, as described above, in the configuration in which each edge switching device SWE has a plurality of upper-link ports Pu and the upper-link ports Pu are directly connected between the edge switching devices SWE, the edge switching device SWE relays the encapsulated frame depending on cases. More specifically, the edge switching device SWE relays the encapsulated frame received at one upper-link port Pu of the plurality of upper-link ports Pu to one of the other upper-link ports Pu based on its own address table.

<<Problem in Relay System (Premise)>>

As described above, in the relay system to which the PBB is applied, the edge switching device SWE and the core switching device SWC relay an unencapsulated frame or an encapsulated frame based on their own address tables. The method based on the address table like this is advantageous when customer terminals TM to which the same service instance identifier ISID is assigned are present widely. For example, in the case where customer terminals TM to which the same service instance identifier ISID is assigned are present in the customer networks 12b, 12d and 12f, the method in which a broadcast domain is established therebetween and flooding is performed when the information of the destination is not learned on the address table is advantageous.

However, the method like this is wasteful when customer terminals TM to which the same service instance identifier ISID is assigned are present only locally. For example, the case where customer terminals TM to which the same service instance identifier ISID is assigned are present only in the customer networks 12a and 12c is assumed. In such a case, the edge switching devices SW1 and SW2 and the core switching device SWC can unambiguously determine the reception and destination ports.

In the method shown in FIG. 1, since the process of address table (learning and retrieval) is necessary even in such a case, the entries of FDB may be wastefully consumed by the learning of MAC address. More specifically, as shown in FIG. 3, the entries of the customer addresses CMAC "CA41" and "CA31" are necessary in the edge switching devices SWE1 and SWE2, and the entries of the encapsulation addresses BMAC "BA1" and "BA2" are necessary in the core switching device SWC.

In the configuration of FIG. 1, one customer network (12a) is accommodated in each lower-link port (for example, Pd[1]) of each edge switch (for example, SWE1) as a matter of convenience, but in practice, a plurality of customer networks 12 are accommodated in many cases. In this case, the plurality of customer networks 12 are discriminated by the service VLAN identifier SVID. Particularly in such a case, since an enormous number of entries are necessary for the address table FDB1 of each edge switch SWE, the consumption of the entry due to this becomes a problem. Furthermore, a lot of edge switching devices SWE are sometimes accommodated in the PBB network 10, so that the consumption of the entry becomes a problem also in the address table FDB2 of the core switching device SWC.

Also, in the method shown in FIG. 1, since a table for establishing a broadcast domain needs to be separately set, the storage capacity may be increased. For example, in the core switching device SWC, it is necessary to set the fact that the ports P[1] and P[2] belong to the same broadcast domain to the table. Specifically, it is necessary to set the correspondence relation between the backbone VLAN identifier BVID "BB" and the ports P[1] and P[2] to the table, and in the case of using the method of the Patent Document 1, it is necessary to set the correspondence relation between the service instance identifier ISID "BBB" and the ports P[1] and P[2].

<<Outline of Relay System (First Embodiment)>>

Figure 5:
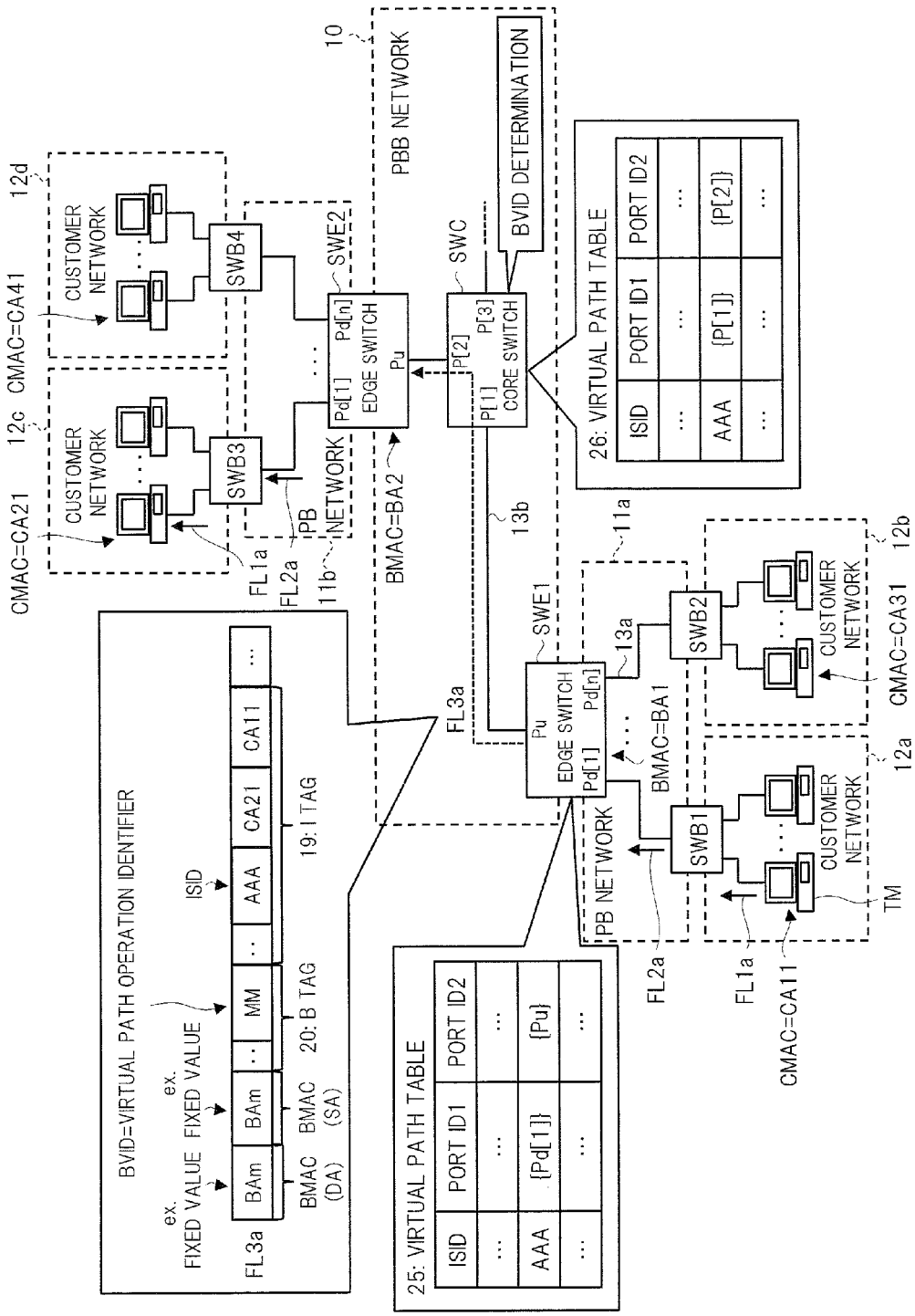
FIG. 5 is a schematic diagram showing a configuration example and an operation example in the relay system according to the first embodiment of the present invention.

FIG. 5 is a schematic diagram showing a configuration example and an operation example in the relay system according to the first embodiment of the present invention. FIG. 5 is a diagram showing the related parts extracted from the configuration shown in FIG. 1 as a matter of convenience. The main configuration will be briefly described below. That is, the relay system of FIG. 5 includes a plurality of edge switching devices SWE1 and SWE2 placed at entrance and exit of the PBB network 10 and a core switching device SWC placed between the plurality of edge switching devices SWE1 and SWE2 in the PBB network 10.

The edge switching device SWE is provided with a plurality of ports (second ports) including lower-link ports Pd[1] to Pd[n] connected to the outside of the PBB network 10 and an upper-link port Pu connected to the PBB network 10. As described above, mainly, the edge switching device SWE converts an unencapsulated frame received from the outside of the PBB network 10 into an encapsulated frame to relay it to the PBB network 10 and converts an encapsulated frame received from the PBB network 10 into an unencapsulated frame to relay it to the outside of the PBB network 10. On the other hand, the core switching device SWC is provided with a plurality of ports (first ports) P[1] to P[3] and relays an encapsulated frame in the PBB network 10.

In the configuration like this, the case where the customer terminals TM to which the same service instance identifier ISID is assigned are present only in the customer networks 12a and 12c is assumed in FIG. 5. Also, the case where communication is performed from the customer terminal TM having the customer address CMAC "CA11" in the customer network 12a to the customer terminal TM having the customer address CMAC "CA21" in the customer network 12c is assumed.

Like the case of FIG. 1, first, the source customer terminal TM transmits a frame FL1a having the same format configuration as that of the frame FL1 of FIG. 2 and having a source customer address CMAC "CA11" and a destination customer address CMAC "CA21". In response to this, the switch SWB1 transmits a frame FL2a having the same format configuration as that of the frame FL2 of FIG. 2 and obtained by adding a predetermined service VLAN identifier SVID to the frame FL1a The edge switching device SWE1 assigns the service instance identifier ISID (here, "AAA") determined in advance by a service provider to the frame FL2a (for example, predetermined service VLAN identifier SVID contained therein) in the same manner as the case of FIG. 1. However, in FIG. 5, unlike the case of FIG. 1, it is determined in advance by a service provider or others to associate the frame having the service instance identifier ISID "AAA" with an operation (hereinafter, referred to as virtual path operation) different from the operation of relaying a frame based on an address table as shown in FIG. 1 (hereinafter, referred to as PBB operation).

Furthermore, unlike the case of FIG. 1, the edge switching device SWE1 of FIG. 5 is provided with a virtual path table (second virtual path table) 25 which retains a correspondence relation between the service instance identifier (first identifier) "AAA" and the two ports in the plurality of ports in the edge switching device SWE1. The contents of the virtual path table 25 are determined in advance by a service provider or others. Here, the lower-link port identifier {Pd[1]} and the upper-link port identifier {Pu} are set as the two ports (actually, port identifiers) of the virtual path table 25.

Based on these, the edge switching device SWE1 associates the frame (unencapsulated frame) FL2a received at the lower-link port Pd[1] with the virtual path operation and transmits the frame (encapsulated frame) FL3a to the upper-link port Pu based on the virtual path table 25. More specifically, in the virtual path operation, the edge switching device SWE1 relays the frame (unencapsulated frame or encapsulated frame) to which the service instance identifier (first identifier) ISID "AAA" retained in the virtual path table 25 is assigned between the two ports retained in the virtual path table 25.

Here, the case where the unencapsulated frame FL2a is converted into the encapsulated frame FL3a and the encapsulated frame FL3a is relayed by the virtual path operation is taken as an example, but the frame to be relayed is not limited to this. The virtual path operation can be applied also to the case where the encapsulated frame is converted into the unencapsulated frame and the unencapsulated frame is relayed, the case of relaying between unencapsulated frames (that is, between lower-link ports) and the case of relaying between encapsulated frames (that is, between upper-link ports).

As shown in FIG. 5, the frame FL3a has the same format configuration as that of the frame FL3 of FIG. 2, but unlike the frame FL3, the frame FL3a is an encapsulated frame for virtual path operation in which various values for the virtual path operation are stored. Specifically, the edge switching device SWE1 first stores "AAA" in the service instance identifier ISID of the frame FL3a in the same manner as the case of FIG. 1. However, unlike the case of FIG. 1, the edge switching device SWE1 stores the values for the virtual path operation in the backbone VLAN identifier BVID, the source encapsulation address BMAC (SA) and the destination encapsulation address BMAC (DA) of the frame FL3a, respectively.

In this example, the edge switching device SWE1 stores a virtual path operation identifier "MM", which indicates that the service instance identifier ISID "AAA" is associated with the virtual path operation, in the backbone VLAN identifier BVID. Also, though not particularly limited, the edge switching device SWE1 stores a multicast or broadcast MAC address BAm in the source encapsulation address BMAC (SA) and the destination encapsulation address BMAC (DA).

The core switching device SWC is provided with a virtual path table (first virtual path table) 26 which retains a correspondence relation between the service instance identifier "AAA" and the two ports in the plurality of ports (here, ports P[1] and P[2]) like the case of the edge switching device SWE1. The contents of the virtual path table 26 are determined in advance by a service provider or others.

The core switching device SWC receives the frame (encapsulated frame) FL3a, and it recognizes that the virtual path operation is associated with the frame FL3a because the virtual path operation identifier "MM" is stored in the backbone VLAN identifier BVID of the frame FL3a. Then, the core switching device SWC relays the frame (encapsulated frame for virtual path operation) FL3a to which the service instance identifier ISID "AAA" is assigned between the two ports retained in the virtual path table 26. More specifically, the core switching device SWC relays the frame FL3a received at one port P[1] of the two ports to the other port P[2].

At this time, the encapsulation address BMAC contained in the frame FL3a is the MAC address unaccompanied by the process of address table (multicast or broadcast MAC address BAm). In this manner, it is possible to certainly prohibit the core switching device SWC from the process of the address table (first address table) FDB2. For example, when the MAC address of the edge switching device SWE is stored in the encapsulation address BMAC like the case of the PBB operation, there is a possibility that the process of the address table FDB2 (learning and retrieval) is executed depending on the specifications of the core switching device SWC, which may cause an erroneous operation.

Note that the core switching device SWC does not cause any particular erroneous operation even if the learning of the address table FDB2 (that is, learning of source encapsulation address BMAC (SA)) is performed, but this case is wasteful because unnecessary entries are generated in the address table FDB2. Therefore, at the time of the virtual path operation, a mechanism which certainly stops the process of the address table FDB2 is desirably provided, and as one example thereof, the edge switching device SWE1 stores the multicast or broadcast MAC address BAm.

The edge switching device SWE2 recognizes that the virtual path operation is associated with the frame FL3a in the same manner as the case of the core switching device SWC, and it transmits the frame FL2a to the port Pd[1] based on its own virtual path table. Though not shown, the virtual path table retains the correspondence relation between the service instance identifier ISID "AAA" and the two ports (upper-link port Pu and lower-link port Pd[1]). However, unlike the case of the core switching device SWC, the edge switching device SWE2 performs decapsulation and adds the service VLAN tag 18 when it transmits the frame FL2a to the port Pd[1]. Thereafter, the switch SWB3 converts the frame FL2a into the frame FL1a and transmits it to the customer terminal TM having the customer address CMAC "CA21".

As described above, by implementing the virtual path operation as shown in FIG. 5, the edge switching device SWE and the core switching device SWC can relay a frame based on the virtual path table without executing the process of the address table. Therefore, compared with the PBB operation, the consumption of the entry in the address tables (FDB1 and FDB2) can be suppressed. Also, depending on cases, latency due to the relay can be reduced. Furthermore, since it is not necessary to set the table for broadcast domain, the storage capacity can be reduced.

As a result, in the switching device and the relay system using the PBB, the efficient point-to-point communication can be achieved. Also, the relay system of FIG. 5 can of course perform the PBB operation as shown in FIG. 1 by changing the settings (here, setting of backbone VLAN identifier BVID).

When the edge switching device SWE recognizes the customer, various methods such as information of ports and layer 3 and a combination thereof can be used in addition to the above-described service VLAN identifier SVID, and the service instance identifier ISID can be assigned to the customer thus recognized. Therefore, the edge switching device SWE can not only establish the virtual path based on the information of the service VLAN identifier SVID but also establish the virtual path between arbitrary devices which can be recognized by the edge switching device SWE (that is, devices to which the service instance identifier ISID can be assigned) in principle.

For example, it is possible to assign the service instance identifier ISID associated with the virtual path operation to the predetermined lower-link ports of the edge switching devices SWE1 and SWE2, thereby establishing the virtual path between arbitrary devices connected to the lower-link ports. At this time, since the process of address table is unnecessary in the virtual path operation, the arbitrary devices are not always limited to those having the MAC address.

<<Detail of Edge Switching Device>>

Figure 6:
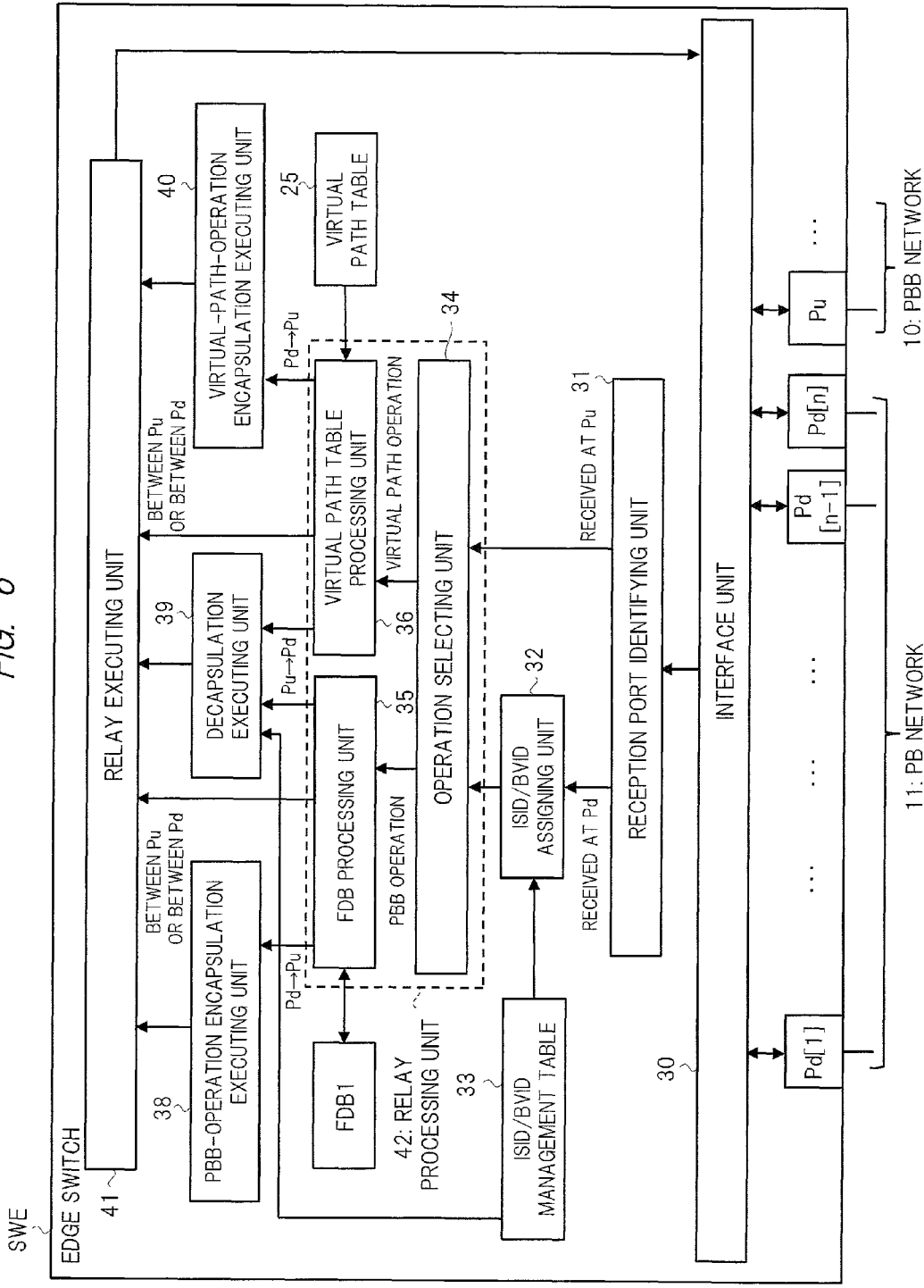
FIG. 6 is a block diagram showing a configuration example of a main part of an edge switching device in the relay system of FIG. 5.

FIG. 6 is a block diagram showing a configuration example of a main part of the edge switching device in the relay system of FIG. 5. The edge switching device shown in FIG. 6 is provided with a plurality of ports (second ports) including a plurality of lower-link ports Pd[1] to Pd[n] connected to the outside (for example, PB network 11) of the PBB network 10 and an upper-link port Pu connected to the PBB network 10, various processing units and various tables. It is also possible to provide a plurality of upper-link ports Pu as described above. Hereinafter, the various processing units and the various tables will be described.

An interface unit 30 includes a reception buffer and a transmission buffer, transmits or receives an unencapsulated frame to or from the lower-link ports Pd[1] to Pd[n], and transmits or receives an encapsulated frame to or from the upper-link port Pu. A reception port identifying unit 31 adds an identifier of one of the plurality of ports which has received the frame (referred to as reception port identifier) to the frame received at that port and transmitted through the reception buffer of the interface unit 30.

The reception port identifying unit 31 transmits the frame to which the reception port identifier has been added to an ISID/BVID assigning unit 32 or an operation selecting unit 34. Specifically, the reception port identifying unit 31 transmits an unencapsulated frame to the ISID/BVID assigning unit 32 when the reception port identifier corresponds to the lower-link ports Pd[1] to Pd[n], and transmits an encapsulated frame to the operation selecting unit 34 when the reception port identifier corresponds to the upper-link port Pu.

The ISID/BVID assigning unit (identifier assigning unit) 32 assigns the service instance identifier ISID and the backbone VLAN identifier BVID including the above-mentioned association regarding the PBB operation or the virtual path operation to the unencapsulated frame received at the lower-link port based on a rule determined in advance by a service provider or others. Specifically, for example, an ISID/BVID management table 33 is determined in advance by a service provider or others, and the ISID/BVID assigning unit 32 assigns the identifier based on the ISID/BVID management table 33.

FIG. 7 is a diagram showing a configuration example of the ISID/BVID management table in FIG. 6. In the example of FIG. 7, corresponding service instance identifier ISID and backbone VLAN identifier BVID are set for each service VLAN identifier SVID. For example, when the service instance identifier ISID "AAA" is assigned to the service VLAN identifier SVID "A" and the virtual path operation is associated with the service instance identifier ISID "AAA" as shown in FIG. 5, the virtual path operation identifier "MM" is set to the backbone VLAN identifier BVID. Also, when the service instance identifier ISID "BBB" is assigned to the service VLAN identifier SVID "B" and the PBB operation is associated with the service instance identifier ISID "BBB", a value "BB" which bundles the "BBB" is set to the backbone VLAN identifier BVID.

The ISID/BVID assigning unit (identifier assigning unit) 32 adds the service instance identifier ISID and the backbone VLAN identifier BVID assigned in the above-described manner to the unencapsulated frame from the reception port identifying unit 31 and then transmits it to the operation selecting unit 34. The operation selecting unit 34 selects the virtual path operation or the PBB operation depending on whether the virtual path operation identifier "MM" is stored in the backbone VLAN identifier BVID contained in the encapsulated frame from the reception port identifying unit 31 or added to the unencapsulated frame by the ISID/BVID assigning unit 32.

When the operation selecting unit 34 selects the virtual path operation, it transmits the frame to a virtual path table processing unit 36, and when the operation selecting unit 34 selects the PBB operation, it transmits the frame to a FDB processing unit 35. The virtual path table processing unit 36 retrieves the virtual path table (second virtual path table) 25 as shown in FIG. 5 by using the service instance identifier ISID of the frame (unencapsulated frame or encapsulated frame) from the operation selecting unit 34 and the reception port identifier added to the frame. The service instance identifier ISID is contained in the frame when the frame from the operation selecting unit 34 is an encapsulated frame, and it is added by the ISID/BVID assigning unit (identifier assigning unit) 32 when the frame is an unencapsulated frame.

The virtual path table processing unit 36 adds a port identifier of a destination port (referred to as destination port identifier) obtained from the retrieval result of the virtual path table 25 to the frame from the operation selecting unit 34, and transmits the frame to a different processing unit in accordance with the correspondence relation between the reception port identifier and the destination port identifier. Specifically, the virtual path table processing unit 36 transmits the encapsulated frame to a decapsulation executing unit 39 when the reception port identifier corresponds to the upper-link port and the destination port identifier corresponds to the lower-link port.

Also, the virtual path table processing unit 36 transmits the unencapsulated frame to a virtual-path-operation encapsulation executing unit 40 when the reception port identifier corresponds to the lower-link port and the destination port identifier corresponds to the upper-link port. Furthermore, the virtual path table processing unit 36 transmits the encapsulated frame or the unencapsulated frame to a relay executing unit 41 when both of the reception port identifier and the destination port identifier correspond to the upper-link port or the lower-link port.

On the other hand, the FDB processing unit 35 executes the process of the address table (second address table) FDB1 (learning and retrieval) as shown in FIG. 3 for the frame (unencapsulated frame or encapsulated frame) from the operation selecting unit 34 as described with reference to FIG. 1. Then, the FDB processing unit 35 adds the port identifier of the destination port (destination port identifier) obtained from the retrieval result of the address table FDB1 to the frame from the operation selecting unit 34, and transmits the frame to a different processing unit in accordance with the correspondence relation between the reception port identifier and the destination port identifier. Specifically, the FDB processing unit 35 transmits the encapsulated frame to the decapsulation executing unit 39 when the reception port identifier corresponds to the upper-link port and the destination port identifier corresponds to the lower-link port.

Also, the FDB processing unit 35 transmits the unencapsulated frame to the PBB-operation encapsulation executing unit 38 when the reception port identifier corresponds to the lower-link port and the destination port identifier corresponds to the upper-link port. Furthermore, the FDB processing unit 35 transmits the encapsulated frame or the unencapsulated frame to the relay executing unit 41 when both of the reception port identifier and the destination port identifier correspond to the upper-link port or the lower-link port.

Here, the operation selecting unit 34, the virtual path table processing unit 36 and the FDB processing unit 35 constitute a relay processing unit (second relay processing unit) 42. The relay processing unit 42 selectively performs the PBB operation and the virtual path operation as described above. In the PBB operation, the relay processing unit 42 relays the unencapsulated frame or the encapsulated frame based on the address table FDB1. On the other hand, in the virtual path operation, the relay processing unit 42 relays the unencapsulated frame or the encapsulated frame to which the service instance identifier ISID retained in the virtual path table 25 is assigned between the two ports retained in the virtual path table 25.

The decapsulation executing unit 39 converts the encapsulated frame from the FDB processing unit 35 or the virtual path table processing unit 36 into the unencapsulated frame like the case of the edge switching device SWE2 of FIG. 1 or FIG. 5, and transmits the unencapsulated frame to the relay executing unit 41. At this time, the decapsulation executing unit 39 obtains the service VLAN identifier SVID from the service instance identifier ISID based on the ISID/BVID assigning unit 33, and determines the service VLAN tag 18 contained in the unencapsulated frame. The PBB-operation encapsulation executing unit 38 converts the unencapsulated frame into the encapsulated frame by the predetermined encapsulation address BMAC or others like the case of the edge switching device SWE1 of FIG. 1, and transmits the encapsulated frame to the relay executing unit 41.

The virtual-path-operation encapsulation executing unit 40 is operated when the unencapsulated frame received at the lower-link port is associated with the virtual path operation and the destination port of the unencapsulated frame is the upper-link port based on the virtual path table 25 as described above. In this case, the virtual-path-operation executing unit 40 converts the unencapsulated frame into the encapsulated frame for virtual path operation by the various values for the virtual path operation, and transmits the encapsulated frame to the relay executing unit 41 as described in the edge switching device SWE1 of FIG. 5.

The virtual-path-operation encapsulation executing unit 40 can store the value added to the unencapsulated frame by the ISID/BVID assigning unit 32 in the service instance identifier ISID and the backbone VLAN identifier BVID at the time of the conversion into the encapsulated frame. Also, the virtual-path-operation encapsulation executing unit 40 desirably stores the predetermined multicast or broadcast MAC address BAm in the encapsulation address BMAC at the time of the conversion into the encapsulated frame.

The relay executing unit 41 transmits the frame from each of the above-described processing units (unencapsulated frame or encapsulated frame) to the predetermined transmission buffer in the interface unit 30. This predetermined transmission buffer is a buffer corresponding to the destination port identifier added to the frame. The transmission buffer in the interface unit 30 receives the frame from the relay executing unit 41 and transmits the frame to the corresponding port (that is, lower-link port or upper-link port corresponding to the destination port identifier).

FIG. 8 is a flowchart showing an example of a process at the time of receiving a frame in the edge switching device of FIG. 6. In the frame reception process of FIG. 8, the edge switching device SWE (specifically, reception port identifying unit 31) determines whether or not the receiving port is the lower-link port Pd[1] to Pd[n] (step S101). When it is not the lower-link port (that is, when it is the upper-link port Pu), the edge switching device SWE transitions to step S103. On the other hand, when it is the lower-link port, the edge switching unit SWE (specifically, ISID/BVID assigning unit 32) assigns the service instance identifier ISID and the backbone VLAN identifier BVID based on the ISID/BVID management table 33, and then transitions to step S103 (step S102).

In the step S103, the edge switching device SWE (specifically, operation selecting unit 34) selects the virtual path operation or not. More specifically, the edge switching device SWE (operation selecting unit 34) selects the virtual path operation or not depending on whether or not the virtual path operation identifier "MM" is stored in the backbone VLAN identifier BVID. When the edge switching device SWE selects the virtual path operation, it executes the process for the virtual path operation of step S104. On the other hand, when the edge switching device SWE does not select the virtual path operation, it selects the PBB operation and executes the predetermined process including the process of the address table (second address table) FDB1 (learning and retrieval) as described with reference to FIG. 1 and FIG. 6 (step S105).

Figure 9:
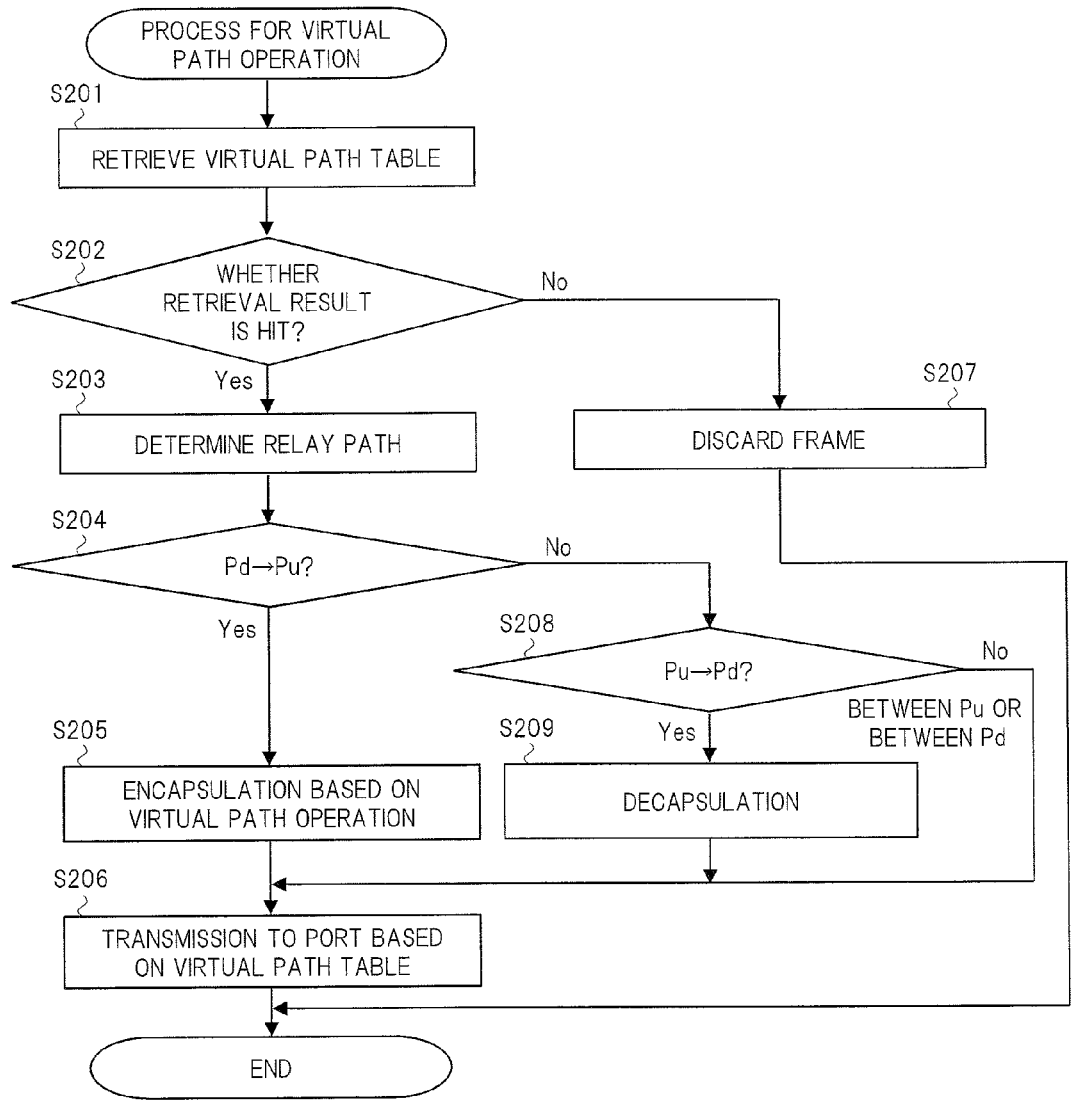
FIG. 9 is a flowchart showing an example of the process in the virtual path operation in FIG. 8.

FIG. 9 is a flowchart showing an example of the process in the virtual path operation in FIG. 8. In the process for the virtual path operation in FIG. 9 (step S104 of FIG. 8), the edge switching device SWE (specifically, virtual path table processing unit 36) retrieves the virtual path table (second virtual path table) 25 with using the service instance identifier ISID as a retrieval key (step S201), and determines whether or not the retrieval result is hit (step S202).

Here, the hit of the retrieval result means the case where the service instance identifier ISID corresponding to the frame is retained in the virtual path table 25 and one of the two ports associated with the service instance identifier ISID coincides with the port which has received the frame. Note that the service instance identifier ISID is contained in the encapsulated frame as described with reference to FIG. 6 or is added to the unencapsulated frame in the step S102 of FIG. 8. Also, the port which has received the frame is added in the reception port identifying unit 31 as described with reference to FIG. 6.

When the retrieval result is hit in the step S202, the edge switching device SWE (virtual path table processing unit 36) determines the relay path based on the relation between the port which has received the frame and the destination port (the other port of the two ports) obtained based on the virtual path table (second virtual path table) 25 (step S203). On the other hand, when the retrieval result is mishit in the step S202, for example, the edge switching device SWE discards the frame (step S207).

When the step S203 determines that the relay is from the lower-link port (Pd) to the upper-link port (Pu) (step S204), the edge switching device SWE (specifically, virtual-path-operation encapsulation executing unit 40) converts the unencapsulated frame into the encapsulated frame for the virtual path operation, and then transitions to step S206 (step S205). When the step S203 determines that the relay is from the upper-link port (Pu) to the lower-link port (Pd) (step S208), the edge switching device SWE (specifically, decapsulation executing unit 39) converts the encapsulated frame into the unencapsulated frame, and then transitions to step S206 (step S209).

Also, when the step S203 determines that the relay is between the upper-link ports (Pu) or between the lower-link ports (Pd) (step S204 and step S208), the edge switching device SWE transitions to step S206. In the step S206, the edge switching device SWE (specifically, relay executing unit 41) transmits the frame to the destination port obtained in the step S203. The frame is the encapsulated frame for virtual path operation resulting from the step S205, the unencapsulated frame resulting from the step S209 or the encapsulated or unencapsulated frame resulting from "No" of the step S208.

<<Detail of Core Switching Device>>

Figure 10:
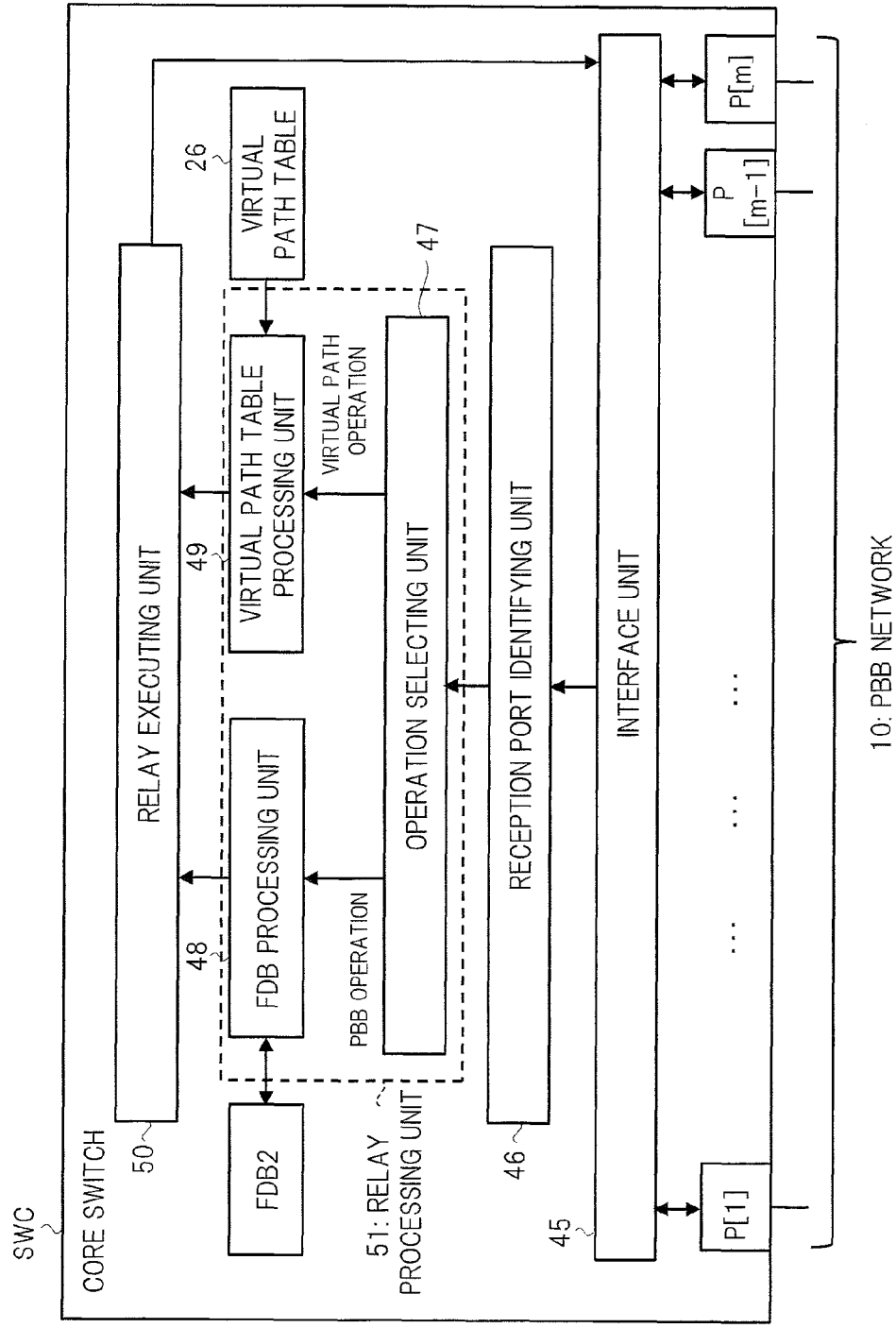
FIG. 10 is a block diagram showing a configuration example of a main part of a core switching device in the relay system of FIG. 5.

FIG. 10 is a block diagram showing a configuration example of a main part of the core switching device in the relay system of FIG. 5. The core switching device SWC shown in FIG. 10 is provided with a plurality of ports (first ports) P[1] to P[m] connected to the PBB network 10, various processing units and various tables. Hereinafter, the various processing units and the various tables will be described.

An interface unit 45 includes a reception buffer and a transmission buffer and transmits or receives an encapsulated frame to or from the plurality of ports P[1] to P[m]. A reception port identifying unit 46 adds an identifier of one of the plurality of ports which has received the encapsulated frame (reception port identifier) to the encapsulated frame received at that port and transmitted through the reception buffer of the interface unit 45.

An operation selecting unit 47 selects the virtual path operation or the PBB operation depending on whether the virtual path operation identifier "MM" is stored in the backbone VLAN identifier BVID contained in the encapsulated frame from the reception port identifying unit 46. When the operation selecting unit 47 selects the virtual path operation, it transmits the encapsulated frame to a virtual path table processing unit 49, and when the operation selecting unit 47 selects the PBB operation, it transmits the encapsulated frame to a FDB processing unit 48.

The virtual path table processing unit 49 retrieves the virtual path table (first virtual path table) 26 as shown in FIG. 5 by using the service instance identifier ISID contained in the encapsulated frame from the operation selecting unit 47 and the reception port identifier added to the encapsulated frame. Then, the virtual path table processing unit 49 adds a port identifier of a destination port (destination port identifier) obtained from the retrieval result of the virtual path table 26 to the encapsulated frame, and transmits the frame to a relay executing unit 50.

The FDB processing unit 48 executes the process of the address table (first address table) FDB2 (learning and retrieval) as shown in FIG. 4 for the encapsulated frame from the operation selecting unit 47 as described with reference to FIG. 1. Then, the FDB processing unit 48 adds the port identifier of the destination port (destination port identifier) obtained from the retrieval result of the address table FDB2 to the encapsulated frame from the operation selecting unit 47, and transmits the frame to the relay executing unit 50.

Here, the operation selecting unit 47, the FDB processing unit 48 and the virtual path table processing unit 49 constitute a relay processing unit (first relay processing unit) 51. The relay processing unit 51 selectively performs the PBB operation and the virtual path operation as described above. In the PBB operation, the relay processing unit 51 relays the encapsulated frame based on the address table FDB2. On the other hand, in the virtual path operation, the relay processing unit 51 relays the encapsulated frame to which the service instance identifier ISID retained in the virtual path table 26 is assigned between the two ports retained in the virtual path table 26.

The relay executing unit 50 transmits the encapsulated frame from the FDB processing unit 48 or the virtual path table processing unit 49 to the predetermined transmission buffer in the interface unit 45. This predetermined transmission buffer is a buffer corresponding to the destination port identifier added to the encapsulated frame. The transmission buffer in the interface unit 45 receives the encapsulated frame from the relay executing unit 50 and transmits the encapsulated frame to the corresponding port (that is, port corresponding to the destination port identifier).

Figure 11:
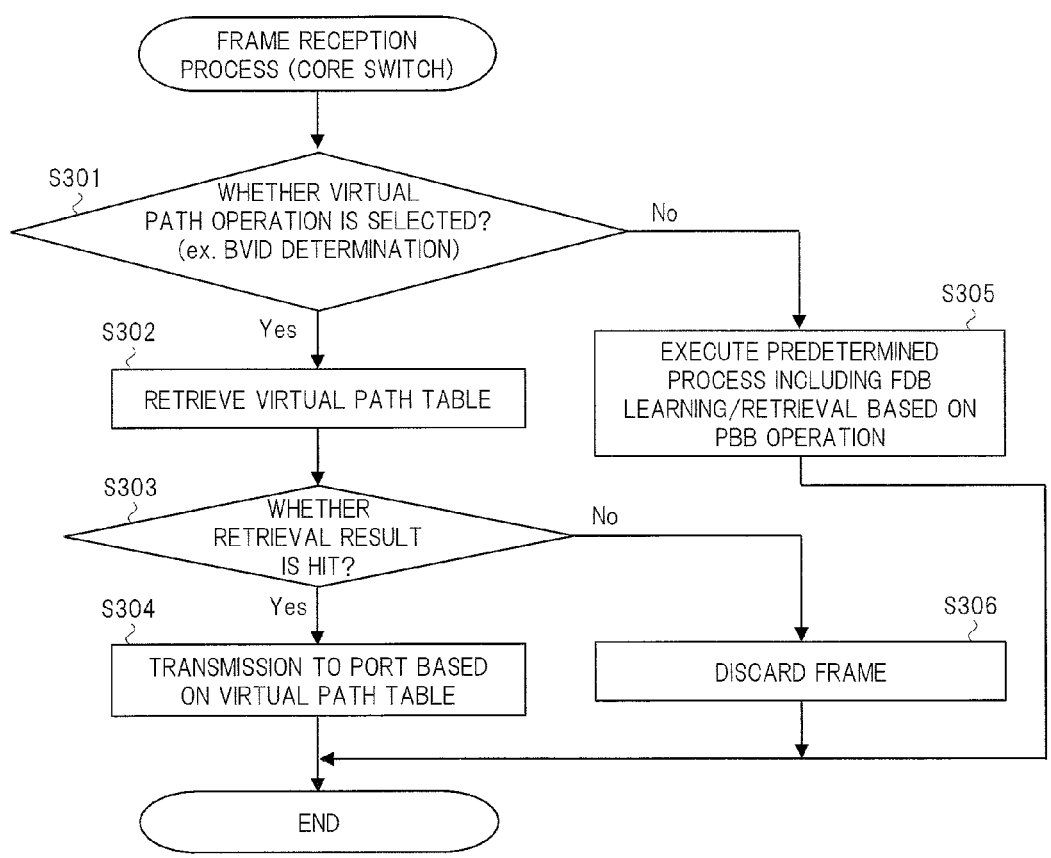
FIG. 11 is a flowchart showing an example of a process at the time of receiving a frame in the core switching device of FIG. 10.

FIG. 11 is a flowchart showing an example of a process at the time of receiving a frame in the core switching device of FIG. 10. In the frame reception process of FIG. 11, the core switching device SWC (specifically, operation selecting unit 47) selects the virtual path operation or not (step S301). More specifically, the core switching device SWC (operation selecting unit 47) selects the virtual path operation or not depending on whether or not the virtual path operation identifier "MM" is stored in the backbone VLAN identifier BVID.

When the core switching device SWC does not select the virtual path operation, it selects the PBB operation and executes the predetermined process including the process of the address table (first address table) FDB2 (learning and retrieval) as described with reference to FIG. 1 and FIG. 10 (step S305). On the other hand, when the core switching device SWC selects the virtual path operation, the core switching device SWC (specifically, virtual path table processing unit 49) retrieves the virtual path table (first virtual path table) 26 with using the service instance identifier ISID as a retrieval key (step S302), and determines whether or not the retrieval result is hit (step S303).

Here, the hit of the retrieval result means the case where the service instance identifier ISID contained in the encapsulated frame is retained in the virtual path table 26 and one of the two ports associated with the service instance identifier ISID coincides with the port which has received the encapsulated frame. The port which has received the encapsulated frame is added in the reception port identifying unit 46 as described with reference to FIG. 10.

When the retrieval result is hit in the step S303, the core switching device SWC (specifically, relay executing unit 50) transmits the encapsulated frame to the destination port (the other port of the two ports mentioned above) obtained based on the virtual path table 26 (step S304). More specifically, the core switching device SWC relays the encapsulated frame containing the service instance identifier retained in the virtual path table 26 between the two ports retained in the virtual path table 26. On the other hand, when the retrieval result is mishit in the step S303, for example, the core switching device SWC discards the frame (step S306).

As described above, by using the switching device and the relay system of the first embodiment, typically, the efficient point-to-point communication can be achieved.

(Second Embodiment)

<<Outline of Relay System (Modified Example [1])>>

Figure 12:
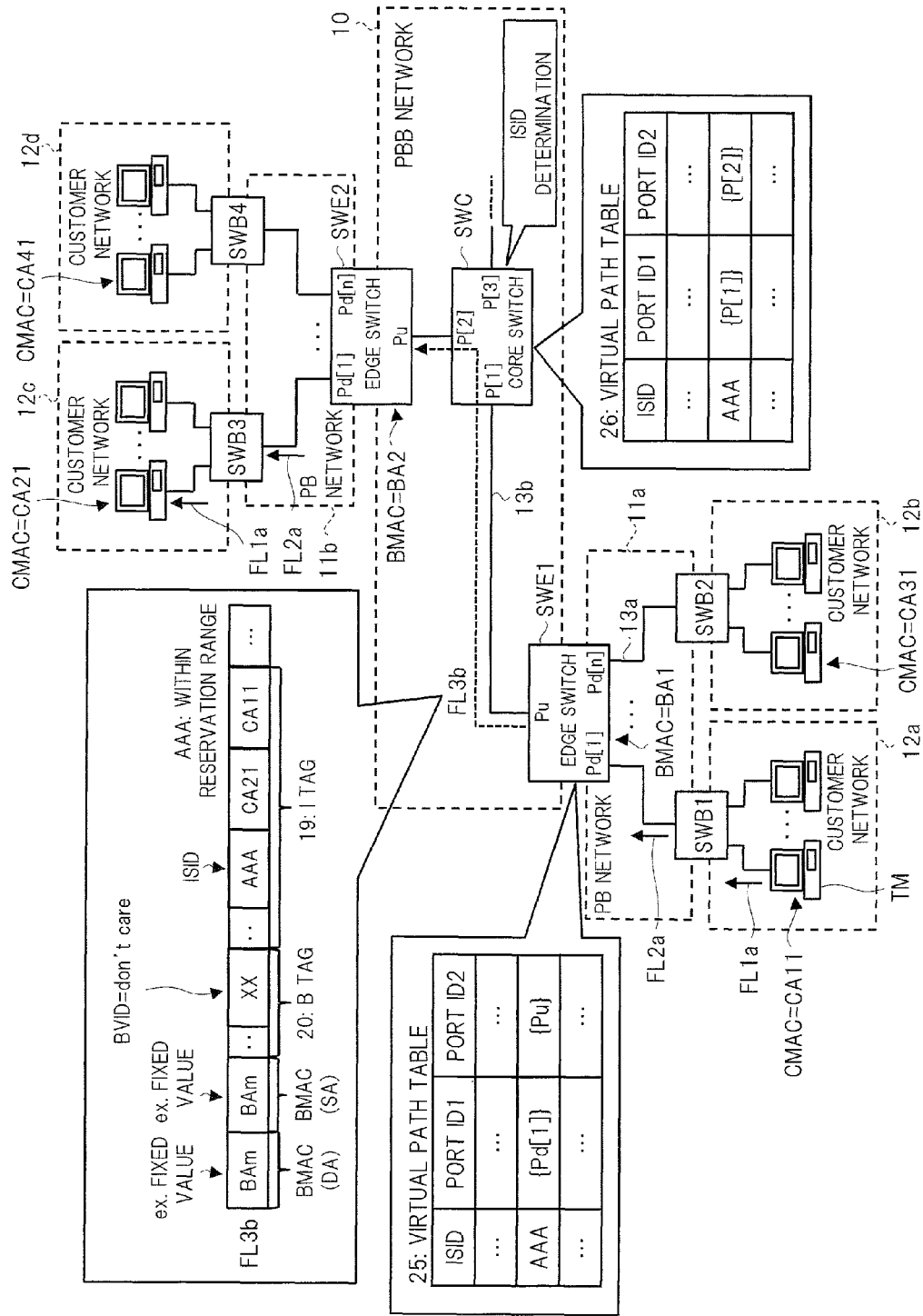
FIG. 12 is a schematic diagram showing a configuration example and an operation example of a relay system according to the second embodiment of the present invention.

FIG. 12 is a schematic diagram showing a configuration example and an operation example of a relay system according to the second embodiment of the present invention. The relay system of FIG. 12 has almost the same configuration as the above-described relay system of FIG. 5. However, in FIG. 12, the method of associating the virtual path operation or the PBB operation with the service instance identifier ISID and its attendant selecting method of the virtual path operation and the PBB operation are different from those of FIG. 5. Since the configuration other than those is identical to that of FIG. 5, the detailed description thereof will be omitted.

In the method of the second embodiment, unlike the method of the first embodiment, a part of a range of the service instance identifier ISID is reserved for the virtual path operation. Based on this, the edge switching device SWE1 (specifically, ISID/BVID assigning unit (identifier assigning unit) 32 of FIG. 6) determines the association with the virtual path operation or the PBB operation depending on whether the service instance identifier ISID assigned to the unencapsulated frame is set to the part of the range. Therefore, in FIG. 12, unlike the case of FIG. 5, the edge switching device SWE1 just stores an arbitrary value in the backbone VLAN identifier BVID in the frame (encapsulated frame for virtual path operation) FL3*b* transmitted from the upper-link port Pu.

When the core switching device SWC of FIG. 12 receives the frame FL3*b* at any one of the plurality of ports P[1] to P[3] (here, P[1]), it selects the virtual path operation or the PBB operation depending on whether the service instance identifier ISID is contained in the part of the range mentioned above unlike the case of FIG. 5. This selection is performed by the operation selecting unit 47 of FIG. 10. Also, the edge switching device SWE2 also performs the similar selection by the operation selecting unit 34 of FIG. 6.

As described above, also by using the switching device and the relay system of the second embodiment, the same effects as the various effects described in the first embodiment can be achieved, and typically, the efficient point-topoint communication can be achieved. When the method of the first embodiment and the method of the second embodiment are compared, a predetermined value corresponding to the virtual path operation identifier "MM" needs to be reserved from the backbone VLAN identifier BVID in the first embodiment, whereas a predetermined range needs to be reserved from the service instance identifier ISID in the second embodiment. Therefore, from the viewpoint of the use efficiency in each bit region of the backbone VLAN identifier BVID and the service instance identifier ISID and the extendability of the number of virtual paths associated with the virtual path operation, the method of the first embodiment is more desirable.

(Third Embodiment)

<<Outline of Relay System (Modified Example [2])>>

Figure 13:
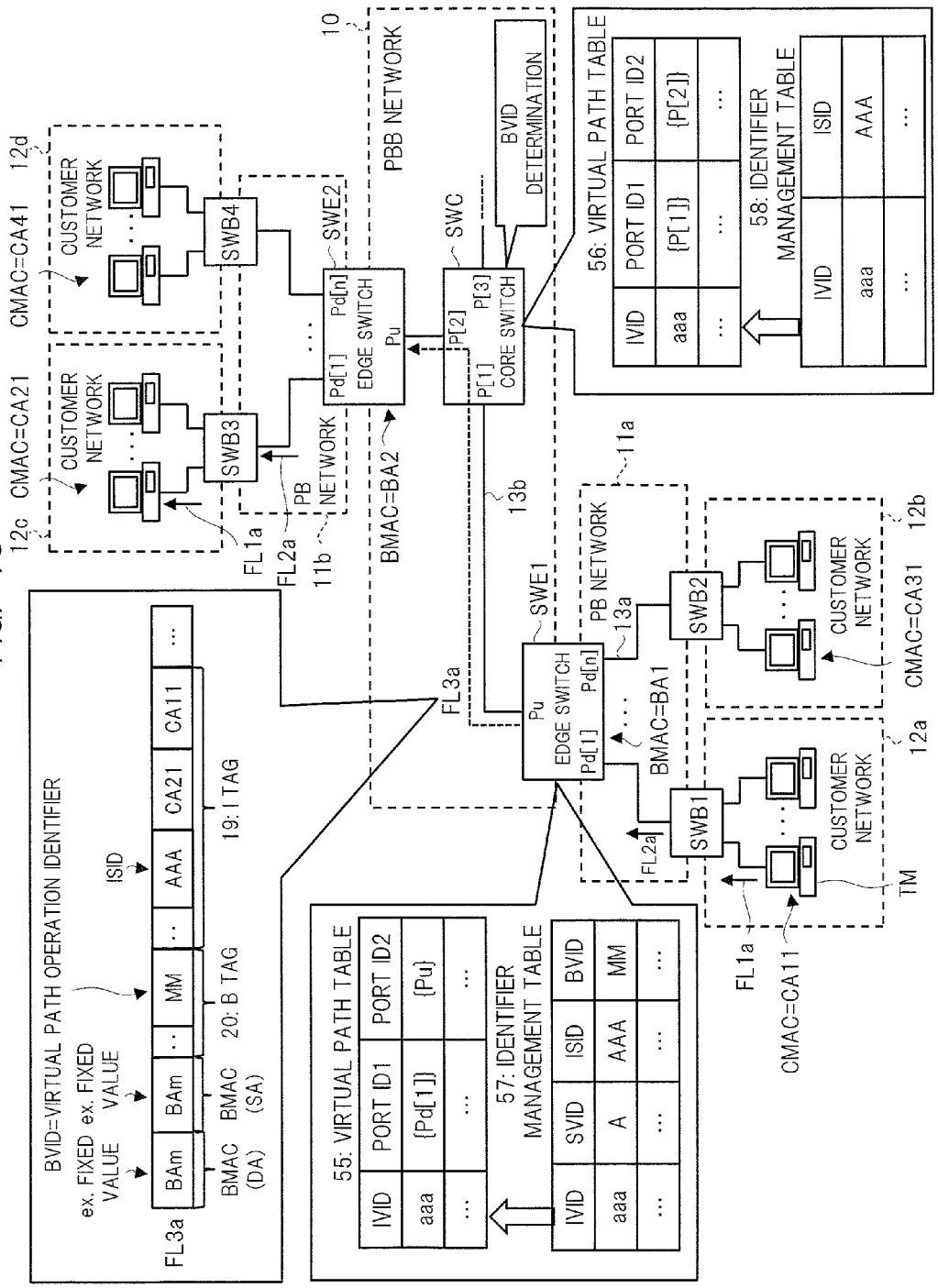
FIG. 13 is a schematic diagram showing a configuration example and an operation example of a relay system according to the third embodiment of the present invention.

FIG. 13 is a schematic diagram showing a configuration example and an operation example of a relay system according to the third embodiment of the present invention. The relay system of FIG. 13 has almost the same configuration as the above-described relay system of FIG. 5. However, in FIG. 13, the point that the virtual path tables 55 and 56 contain an internal VLAN identifier IVID instead of the service instance identifier ISID and the point that the edge switching device SWE and the core switching device SWC include identifier management tables 57 and 58 are different from the case of FIG. 5. Since the configuration other than those is identical to that of FIG. 5, the detailed description thereof will be omitted.

In the edge switching device SWE and the core switching device SWC, it is sometimes more desirable to manage the relay inside the device after once converting the identifier into the internal VLAN identifier IVID instead of directly using the service instance identifier ISID like the first embodiment. For example, the internal VLAN identifier IVID has a shorter bit length than the service instance identifier ISID, which makes it possible to reduce the capacity of the address table, facilitate the process inside the device, and reduce the processing load.

In FIG. 13, the edge switching device SWE1 is provided with a virtual path table 55 and an identifier management table 57. The identifier management table 57 retains the correspondence relation among the internal VLAN identifier IVID, the service VLAN identifier SVID, the service instance identifier ISID and the backbone VLAN identifier BVID in advance based on the setting by a service provider or others. For example, when the edge switching device SWE1 receives the frame FL2a at the lower-link port Pd[1], it converts the service VLAN identifier SVID (here, "A") contained in the frame FL2a into the internal VLAN identifier IVID (here, "aaa") based on the identifier management table 57.

The virtual path table 55 retains the correspondence relation between the internal VLAN identifier IVID and the two ports of the plurality of ports in the edge switching device SWE1. In the example of FIG. 13, the lower-link port identifier {Pd[1]} and the upper-link port identifier {Pu} are associated with the internal VLAN identifier IVID "aaa". The edge switching device SWE1 relays the frame FL2a received at the lower-link port Pd[1] to the upper-link port Pu based on the virtual path table 55. At this time, the edge switching device SWE1 performs the encapsulation by using the service instance identifier ISID (here, "AAA") and the backbone VLAN identifier BVID (here, virtual path operation identifier "MM") based on the identifier management table 57 in the same manner as the case of FIG. 5.

Similarly, the core switching device SWC is also provided with a virtual path table 56 and an identifier management table 58. The identifier management table 58 retains the correspondence relation between the internal VLAN identifier IVID and the service instance identifier ISID in advance based on the setting by a service provider or others. For example, when the core switching device SWC receives the frame FL3a at the port P[1], it converts the service instance identifier ISID (here, "AAA") contained in the frame FL3a into the internal VLAN identifier IVID (here, "aaa") based on the identifier management table 58.

The virtual path table 56 retains the correspondence relation between the internal VLAN identifier IVID and the two ports of the plurality of ports in the core switching device SWC. In the example of FIG. 13, the port identifier {P[1]} and the port identifier {P[2]} are associated with the internal VLAN identifier IVID "aaa". The core switching device SWC recognizes the virtual path operation by the backbone VLAN identifier BVID (virtual path operation identifier "MM") and relays the frame FL3a received at the port P[1] to the port P[2] based on the virtual path table 56 in the same manner as the case of FIG. 5.

As can be seen from FIG. 13 and FIG. 5 and others described above, the virtual path table retains the correspondence relation between the first identifier and the two ports of the plurality of ports. The first identifier is the service instance identifier ISID or the internal VLAN identifier IVID assigned so as to correspond thereto inside the device. In the virtual path operation, the unencapsulated frame or the encapsulated frame containing the first identifier retained in the virtual path table is relayed between the two ports retained in the virtual path table.

<<Detail of Edge Switching Device (Modified Example [2])>>

Figure 14:
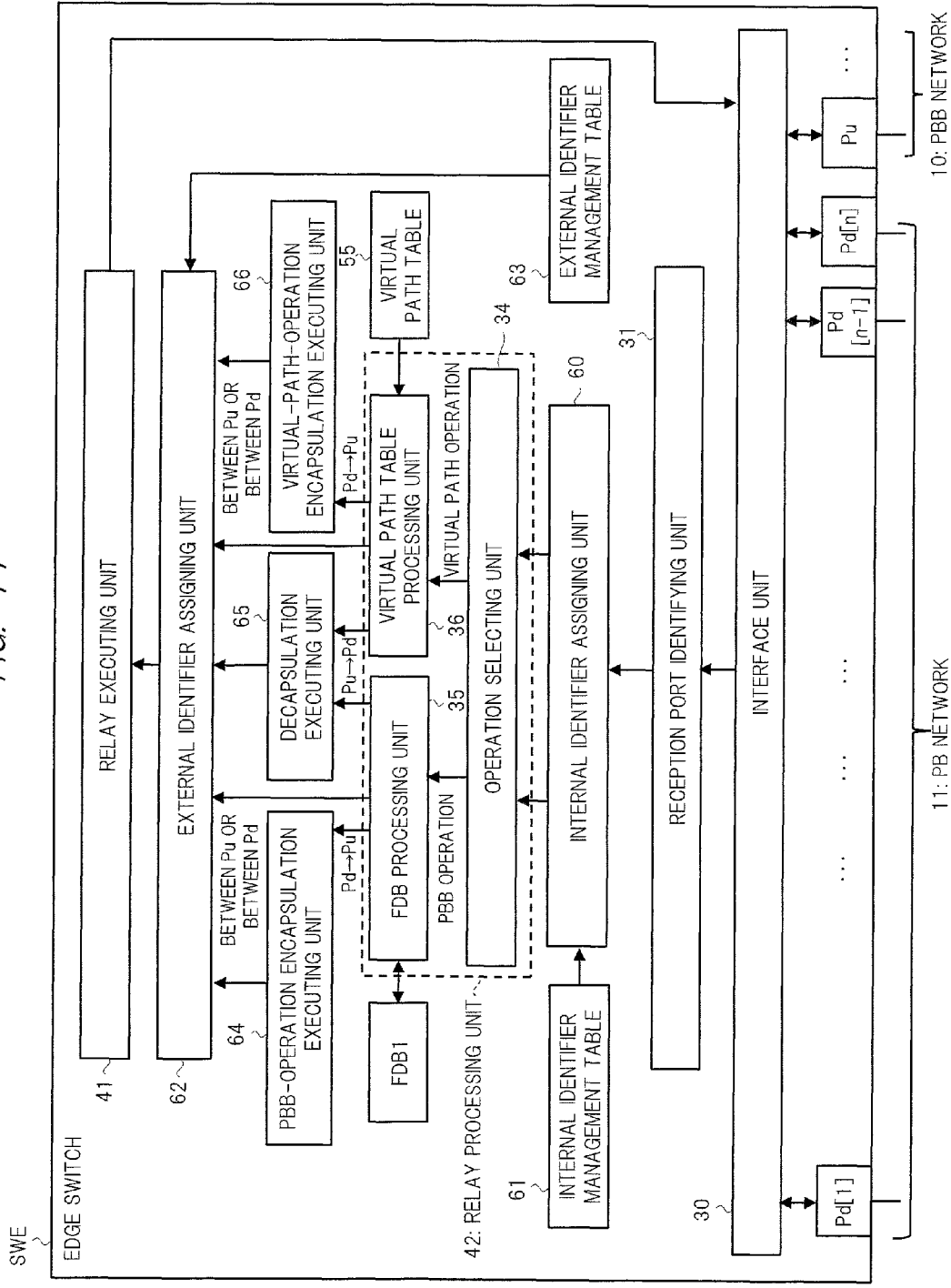
FIG. 14 is a block diagram showing a configuration example of a main part of an edge switching device in the relay system of FIG. 13.

FIG. 14 is a block diagram showing a configuration example of a main part of an edge switching device in the relay system of FIG. 13. FIG. 15A is a diagram showing a configuration example of an internal identifier management table in FIG. 14 and FIG. 15B is a diagram showing a configuration example of an external identifier management table in FIG. 14.

Compared with the configuration example of FIG. 6 described above, the edge switching device SWE shown in FIG. 14 has the configuration in which an internal identifier assigning unit 60 (and internal identifier management table 61) and an external identifier assigning unit 62 (and external identifier management table 63) are provided instead of the ISID/BVID assigning unit (identifier assigning unit) 32 of FIG. 6. Also, in conjunction with this, compared with the configuration example of FIG. 6 described above, the operations of the PBB-operation encapsulation executing unit 64, the decapsulation executing unit 65 and the virtual-path-operation encapsulation executing unit 66 are slightly different. Since the configuration and operation other than those are almost identical to those of FIG. 6, the difference from FIG. 6 will be mainly described below.

The internal identifier assigning unit 60 is provided on a latter stage of the reception port identifying unit 31, and when an unencapsulated frame or an encapsulated frame is received at a plurality of ports (lower-link ports Pd[1] to Pd[n] or upper-link port Pu), the internal identifier assigning unit 60 assigns the internal identifier based on the internal identifier management table 61. Specifically, the internal identifier assigning unit 60 converts the service VLAN identifier SVID contained in the unencapsulated frame or the service instance identifier ISID contained in the encapsulated frame into the internal VLAN identifier IVID.

As shown in FIG. 15A, in the internal identifier management table 61, the internal VLAN identifier IVID is retained in association with the reception port identifier and the service VLAN identifier SVID or the service instance identifier ISID. Furthermore, in this example, the virtual path operation identifier is also retained in association therewith in addition to the internal VLAN identifier IVID. Here, the case where the PBB operation or the virtual path operation is selected by the method shown in FIG. 5 is taken as an example, but when it is selected by the method shown in FIG. 12, the virtual path operation identifier is unnecessary.

As one example, an object to be processed by the internal identifier assigning unit 60 is the unencapsulated frame received at the lower-link port Pd[1] and containing the service VLAN identifier SVID "A". In the example of the internal identifier management table 61 of FIG. 15A, the internal VLAN identifier IVID "aaa" is associated with the lower-link port Pd[1] and the service VLAN identifier SVID "A" and the virtual path operation identifier "MM" is associated therewith in advance. Based on this, the internal identifier assigning unit 60 converts the service VLAN identifier SVID "A" contained in the unencapsulated frame into the internal VLAN identifier IVID "aaa" and adds the virtual path operation identifier "MM", and then transmits the frame to the relay processing unit 42.

As another example, an object to be processed by the internal identifier assigning unit 60 is the encapsulated frame received at the upper-link port Pu and containing the service instance identifier ISID "AAA". In the example of the internal identifier management table 61 of FIG. 15A, the internal VLAN identifier IVID "aaa" is associated with the upper-link port Pu and the service instance identifier ISID "AAA" in advance. Based on this, the internal identifier assigning unit 60 converts the service instance identifier ISID "AAA" contained in the encapsulated frame into the internal VLAN identifier IVID "aaa", and then transmits the frame to the relay processing unit 42.

The relay processing unit 42 executes the predetermined process based on the address table FDB1 or the virtual path table 55 in the same manner as the case of FIG. 6. However, unlike the case of FIG. 6, the address table FDB1 or the virtual path table 55 retains the internal VLAN identifier IVID instead of the service instance identifier ISID. Therefore, the relay processing unit 42 executes the same process as the case of FIG. 6 by using the internal VLAN identifier IVID.

On the other hand, the external identifier assigning unit 62 is provided on a former stage of the relay executing unit 41, and when an unencapsulated frame or an encapsulated frame is transmitted from a plurality of ports (lower-link ports Pd[1] to Pd[n] or upper-link port Pu), the external identifier assigning unit 62 assigns the external identifier based on the external identifier management table 63. Specifically, the external identifier assigning unit 62 converts the internal VLAN identifier IVID into the service VLAN identifier SVID contained in the unencapsulated frame or the service instance identifier ISID and the backbone VLAN identifier BVID contained in the encapsulated frame.

As shown in FIG. 15B, in the external identifier management table 63, the service VLAN identifier SVID is retained in association with the transmission port identifier and the internal VLAN identifier IVID, and the service instance identifier ISID and the backbone VLAN identifier BVID are retained in association with the transmission port identifier and the internal VLAN identifier IVID.

As one example, an object to be processed by the external identifier assigning unit 62 is the unencapsulated frame transmitted from the lower-link port Pd[1] and associated with the internal VLAN identifier IVID "aaa". In the example of the external identifier management table 63 of FIG. 15B, the service VLAN identifier SVID "A" is associated with the lower-link port Pd[1] and the internal VLAN identifier IVID "aaa" in advance. Based on this, the external identifier assigning unit 62 converts the internal VLAN identifier IVID "aaa" contained in the unencapsulated frame into the service VLAN identifier SVID "A" and transmits the frame to the relay executing unit 41.

As another example, an object to be processed by the external identifier assigning unit 62 is the encapsulated frame transmitted from the upper-link port Pu and containing the internal VLAN identifier IVID "aaa". In the example of the external identifier management table 63 of FIG. 15B, the service instance identifier ISID "AAA" and the backbone VLAN identifier BVID "MM" (that is, virtual path operation identifier) are associated with the upper-link port Pu and the internal VLAN identifier IVID "aaa" in advance. Based on this, the external identifier assigning unit 62 converts the internal VLAN identifier IVID "aaa" contained in the encapsulated frame into the service instance identifier ISID "AAA" and the backbone VLAN identifier BVID "MM", and then transmits the frame to the relay executing unit 41.

In conjunction with the operation like this, the PBB-operation encapsulation executing unit 64 and the virtual-path-operation encapsulation executing unit 66 do not perform the setting of the service instance identifier ISID and the backbone VLAN identifier BVID and perform the setting of the encapsulation address BMAC and others unlike the case of FIG. 6. Also, the decapsulation executing unit 65 does not perform the setting of the service VLAN identifier SVID and performs the deletion of the encapsulation address BMAC and others unlike the case of FIG. 6.

Note that each of the internal identifier management table 61 and the external identifier management table 63 is formed of one table in FIG. 15A and FIG. 15B, but since the retrieval key and the retrieval result differ depending on the lower-link port or the upper-link port, the table may be managed by dividing it in accordance with the type of the ports. Also, though not shown, the core switching device SWC is provided with the internal identifier assigning unit and the external identifier assigning unit like the case of FIG. 14. For example, the internal identifier assigning unit converts the service instance identifier ISID into the internal VLAN identifier IVID, and the external identifier assigning unit converts the internal VLAN identifier IVID into the service instance identifier ISID.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, in the first embodiment, as the service instance identifier ISID at the time of the virtual path operation, it is not always necessary to use all of the 24 bits, and a part of the bits such as the lower 12 bits may be used. In this manner, although the number of virtual paths capable of being associated with the virtual path operation is reduced, the storage capacity of the virtual path tables 25 and 26 can be correspondingly reduced.

Also, in the embodiments described above, with respect to the retrieving method of the virtual path tables 25 and 26, the two ports are obtained with using the service instance identifier ISID as a retrieval key, and one port which does not correspond to the reception port identifier is selected from the two ports and the selected one port is used as the destination port. However, the method is not limited to this, and a method in which the destination port is obtained with using the service instance identifier ISID and the reception port identifier as retrieval keys is also applicable. In this case, for example, when the virtual path table 25 of FIG. 5 is taken as an example, the entry made up of the combination of "AAA" and {Pd[1]} and the entry made up of the combination of "AAA" and {Pu} are necessary. Therefore, compared with the retrieving method of the embodiments described above, the capacity of the virtual path table may be increased, but the retrieval speed of the virtual path table is increased because the process to select the destination port from the two ports becomes unnecessary.

What is claimed is:

1. A switching device which is placed in a PBB network in which relay based on a Provider Backbone Bridge (PBB) standard is performed and relays an encapsulated frame, wherein
the encapsulated frame contains a service instance identifier, a backbone Virtual Local Area Network (VLAN) identifier and an encapsulation address based on the PBB standard,
the switching device includes:
a plurality of ports;
a virtual path table which retains a correspondence relation between a first identifier and two ports in the plurality of ports set in advance;
an address table which retains a correspondence relation between the plurality of ports and the encapsulation address; and
a relay processor that selectively performs a PBB operation in which the encapsulated frame is relayed based on the address table and a virtual path operation in which the encapsulated frame containing the first identifier retained in the virtual path table is relayed between the two ports retained in the virtual path table,
the first identifier is the service instance identifier or an internal VLAN identifier assigned inside the switching device in association with the service instance identifier,
the encapsulated frame relayed in the virtual path operation stores a predetermined virtual path operation identifier indicating the virtual path operation in the backbone VLAN identifier, and
the relay processor has an operation selector that selects the virtual path operation or the PBB operation depending on whether or not the predetermined virtual path operation identifier is stored in the backbone VLAN identifier when the encapsulated frame is received at any one of the plurality of ports.

2. The switching device according to claim 1, wherein the first identifier has a part of a range reserved for the virtual path operation, and
the operation selector selects the virtual path operation or the PBB operation depending on whether or not the first identifier is contained in the part of the range when the encapsulated frame is received at any one of the plurality of ports.

3. The switching device according to claim 1, wherein, in the encapsulated frame relayed in the virtual path operation, a multicast or broadcast address is stored in the encapsulation address.

4. The switching device according to claim 2, wherein, in the encapsulated frame relayed in the virtual path operation, a multicast or broadcast address is stored in the encapsulation address.

5. A switching device which is placed at an entrance or an exit of a Provider Backbone Bridge (PBB) network in which relay based on a PBB standard is performed, converts an unencapsulated frame received from outside of the PBB network into an encapsulated frame to relay the encapsulated frame to the PBB network, and converts the encapsulated frame received from the PBB network into the unencapsulated frame to relay the unencapsulated frame to outside of the PBB network, wherein
the unencapsulated frame contains a customer address,
the encapsulated frame has a configuration in which a service instance identifier, a backbone Virtual Local Area Network (VLAN) identifier and an encapsulation address are added to the unencapsulated frame based on the PBB standard,
the switching device includes:
a plurality of ports including a lower-link port connected to outside of the PBB network and an upper-link port connected to the PBB network;
a virtual path table which retains a correspondence relation between a first identifier and two ports in the plurality of ports set in advance;
an address table which retains a correspondence relation among the plurality of ports, the customer address and the encapsulation address;
a relay processor that selectively performs a PBB operation in which the unencapsulated frame or the encapsulated frame is relayed based on the address table and a virtual path operation in which the unencapsulated frame or the encapsulated frame to which the first identifier retained in the virtual path table is assigned is relayed between the two ports retained in the virtual path table; and
an identifier assignor that assigns the first identifier and the backbone VLAN identifier to the unencapsulated frame received at the lower-link port based on a predetermined rule,
the first identifier is the service instance identifier or an internal VLAN identifier assigned inside the switching device in association with the service instance identifier,
the identifier assignor determines an association with the virtual path operation or the PBB operation depending on whether or not the backbone VLAN identifier assigned to the unencapsulated frame is set to a virtual path operation identifier indicating the virtual path operation, and
the relay processor has an operation selector that selects the virtual path operation or the PBB operation depending on whether or not the virtual path operation identifier is stored in the backbone VLAN identifier when the encapsulated frame is received at the upper-link port.

6. The switching device according to claim 5, wherein the first identifier has a part of a range reserved for the virtual path operation, and the identifier assignor determines an association with the virtual path operation or the PBB operation depending on whether or not the first identifier assigned to the unencapsulated frame is set to the part of the range.

7. The switching device according to claim 6, further comprising:
a virtual-path-operation encapsulation executor that converts the unencapsulated frame into an encapsulated frame for the virtual path operation when the unencapsulated frame received at the lower-link port is associated with the virtual path operation and a destination port of the unencapsulated frame is the upper-link port based on the virtual path table, wherein
the virtual-path-operation encapsulation executor stores a multicast or broadcast address in the encapsulation address of the encapsulated frame for the virtual path operation.

8. The switching device according to claim 5, further comprising:
a virtual-path-operation encapsulation executor that converts the unencapsulated frame into an encapsulated frame for the virtual path operation when the unencapsulated frame received at the lower-link port is associated with the virtual path operation and a destination port of the unencapsulated frame is the upper-link port based on the virtual path table, wherein
the virtual-path-operation encapsulation executor stores a multicast or broadcast address in the encapsulation address of the encapsulated frame for the virtual path operation.

9. The switching device according to claim 5, wherein
the switching device further includes a decapsulation executor that converts the encapsulated frame into the unencapsulated frame when the virtual path operation is selected in the operation selector and a destination port of the encapsulated frame is the lower-link port based on the virtual path table.

10. The switching device according to claim 3, wherein
the first identifier is the internal VLAN identifier,
the unencapsulated frame further contains a service VLAN identifier, and
the identifier assignor includes:
an internal identifier assignor that converts the service VLAN identifier contained in the unencapsulated frame or the service instance identifier contained in the encapsulated frame into the internal VLAN identifier when the unencapsulated frame or the encapsulated frame is received at the plurality of ports; and
an external identifier assignor that converts the internal VLAN identifier into the service VLAN identifier contained in the unencapsulated frame or the service instance identifier and the backbone VLAN identifier contained in the encapsulated frame when the unencapsulated frame or the encapsulated frame is transmitted from the plurality of ports.

11. A relay system, comprising:
a Provider Backbone Bridge (PBB) network in which relay based on a PBB standard is performed;
a plurality of edge switching devices which are placed at an entrance or an exit of the PBB network, convert an unencapsulated frame received from outside of the PBB network into an encapsulated frame to relay the encapsulated frame to the PBB network, and convert the encapsulated frame received from the PBB network into the unencapsulated frame to relay the unencapsulated frame to outside of the PBB network; and
a core switching device which is placed between the plurality of edge switching devices in the PBB network and relays the encapsulated frame, wherein
the unencapsulated frame contains a customer address,
the encapsulated frame has a configuration in which a service instance identifier, a backbone Virtual Local Area Network (VLAN) identifier and an encapsulation address are added to the unencapsulated frame based on the PBB standard,
the core switching device includes:
a plurality of first ports;
a first virtual path table which retains a correspondence relation between a first identifier and two ports in the plurality of first ports set in advance;
a first address table which retains a correspondence relation between the plurality of first ports and the encapsulation address; and
a first relay processor that selectively performs a PBB operation in which the encapsulated frame is relayed based on the first address table and a virtual path operation in which the encapsulated frame containing the first identifier retained in the first virtual path table is relayed between the two ports retained in the first virtual path table, and
the first identifier is the service instance identifier or an internal VLAN identifier assigned inside the core switching device in association with the service instance identifier,
the encapsulated frame relayed in the virtual path operation stores a predetermined virtual path operation identifier indicating the virtual path operation in the backbone VLAN identifier, and
the first relay processor has an operation selector that selects the virtual path operation or the PBB operation depending on whether or not the predetermined virtual path operation identifier is stored in the backbone VLAN identifier when the encapsulated frame is received at any one of the plurality of first ports.

12. The relay system according to claim 11, wherein
each of the plurality of edge switching devices includes:
a plurality of second ports including a lower-link port connected to outside of the PBB network and an upper-link port connected to the PBB network;
a second virtual path table which retains a correspondence relation between the first identifier and two ports in the plurality of second ports set in advance;
a second address table which retains a correspondence relation among the plurality of second ports, the customer address and the encapsulation address;
a second relay processor that selectively performs a PBB operation in which the unencapsulated frame or the encapsulated frame is relayed based on the second address table and a virtual path operation in which the unencapsulated frame or the encapsulated frame to which the first identifier retained in the second virtual path table is assigned is relayed between the two ports retained in the second virtual path table; and
an identifier assignor that assigns the first identifier and the backbone VLAN identifier to the unencapsulated frame received at the lower-link port based on a predetermined rule.

13. The relay system according to claim 12, wherein
the identifier assignor of each of the plurality of edge switching devices determines an association with the virtual path operation or the PBB operation depending on whether or not the backbone VLAN identifier assigned to the unencapsulated frame is set to a virtual path operation identifier indicating the virtual path operation, and the first relay processor of the core switching device selects the virtual path operation or the PBB operation depending on whether or not the virtual path operation identifier is stored in the backbone VLAN identifier when the encapsulated frame is received at any one of the plurality of first ports.

14. The relay system according to claim 13, wherein
each of the plurality of edge switching devices further includes a virtual-path-operation encapsulation executor that converts the unencapsulated frame into an encapsulated frame for the virtual path operation when the unencapsulated frame received at the lower-link port is associated with the virtual path operation and a destination port of the unencapsulated frame is the upper-link port based on the virtual path table, and the virtual-path-operation encapsulation executor stores a multicast or broadcast address in the encapsulation address of the encapsulated frame for the virtual path operation.

15. The relay system according to claim 12, wherein
the first identifier has a part of a range reserved for the virtual path operation, the identifier assignor of each of the plurality of edge switching devices determines an association with the virtual path operation or the PBB operation depending on whether or not the first identifier assigned to the unencapsulated frame is set to the part of the range, and the first relay processor of the core switching device selects the virtual path operation or the PBB operation depending on whether or not the first identifier is contained in the part of the range when the encapsulated frame is received at any one of the plurality of first ports.

16. The relay system according to claim 15, wherein
each of the plurality of edge switching devices further includes a virtual-path-operation encapsulation executor that converts the unencapsulated frame into an encapsulated frame for the virtual path operation when the unencapsulated frame received at the lower-link port is associated with the virtual path operation and a destination port of the unencapsulated frame is the upper-link port based on the virtual path table, and the virtual-path-operation encapsulation executor stores a multicast or broadcast address in the encapsulation address of the encapsulated frame for the virtual path operation.

17. The relay system according to claim 12, wherein
the first identifier is the internal VLAN identifier, the unencapsulated frame further includes a service VLAN identifier, the identifier assignor of each of the plurality of edge switching devices includes:

an internal identifier assignor that converts the service VLAN identifier contained in the unencapsulated frame or the service instance identifier contained in the encapsulated frame into the internal VLAN identifier when the unencapsulated frame or the encapsulated frame is received at the plurality of second ports; and an external identifier assignor that converts the internal VLAN identifier into the service VLAN identifier contained in the unencapsulated frame or the service instance identifier and the backbone VLAN identifier contained in the encapsulated frame when the unencapsulated frame or the encapsulated frame is transmitted from the plurality of second ports.

* * * * *